(12) United States Patent
Furuhata

(10) Patent No.: US 11,181,547 B2
(45) Date of Patent: Nov. 23, 2021

(54) INERTIAL SENSOR, ELECTRONIC DEVICE, AND VEHICLE

(71) Applicant: SEIKO EPSON CORPORATION, Tokyo (JP)

(72) Inventor: Makoto Furuhata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 84 days.

(21) Appl. No.: 16/694,569

(22) Filed: Nov. 25, 2019

(65) Prior Publication Data

US 2020/0166539 A1 May 28, 2020

(30) Foreign Application Priority Data

Nov. 28, 2018 (JP) .................... 2018-222491

(51) Int. Cl.
*G01P 15/18* (2013.01)
*G01C 19/5712* (2012.01)
(Continued)

(52) U.S. Cl.
CPC ............ *G01P 15/18* (2013.01); *G01C 19/574* (2013.01); *G01C 19/5712* (2013.01); *G01C 19/5719* (2013.01); *G01C 19/5747* (2013.01); *G01P 3/44* (2013.01); *G01P 15/0802* (2013.01); *G01S 19/49* (2013.01); *G01C 21/16* (2013.01); *G05D 1/027* (2013.01)

(58) Field of Classification Search
CPC ............ G01C 19/5712; G01C 19/5747; G01C 19/5649; G01C 19/574; G01C 19/5719; G01C 19/5769; G01C 19/5762
See application file for complete search history.

(56) References Cited

U.S. PATENT DOCUMENTS

| 5,501,893 | A | 3/1996 | Laermer et al. |
| 6,571,630 | B1 | 6/2003 | Weinberg et al. |

(Continued)

FOREIGN PATENT DOCUMENTS

| JP | H07-503815 | 4/1995 |
| JP | 2002-540406 | 11/2002 |

(Continued)

*Primary Examiner* — Helen C Kwok
(74) *Attorney, Agent, or Firm* — Workman Nydegger

(57) ABSTRACT

An inertial sensor includes a substrate, a first detection movable body and a second detection movable body which overlap the substrate in a direction along the Z-axis and are disposed side by side in a direction along the X-axis, a first detection spring that supports the first detection movable body to be displaceable in the direction along the X-axis, a second detection spring that supports the second detection movable body to be displaceable in the direction along the X-axis, a first drive portion that drives the first detection movable body with a drive component in the direction along the X-axis, a second drive portion that drives the second detection movable body with the drive component in the direction along the X-axis, and a first and second fixed detection electrodes disposed on the substrate and facing the first and second detection movable bodies. The first and second detection springs are provided with a first thin portion thinner than a thickness of the first and second detection movable bodies in the direction along the Z-axis.

8 Claims, 20 Drawing Sheets

(51) Int. Cl.
   *G01C 19/5719* (2012.01)
   *G01C 19/5747* (2012.01)
   *G01C 19/574* (2012.01)
   *G01P 3/44* (2006.01)
   *G01S 19/49* (2010.01)
   *G01P 15/08* (2006.01)
   *G05D 1/02* (2020.01)
   *G01C 21/16* (2006.01)

(56) References Cited

U.S. PATENT DOCUMENTS

| | | | |
|---|---|---|---|
| 7,213,458 B2 | 5/2007 | Weber et al. | |
| 8,104,343 B2 | 1/2012 | Klemetti et al. | |
| 8,635,909 B2 | 1/2014 | Klemetti et al. | |
| 8,646,333 B2 | 2/2014 | Klemetti et al. | |
| 2008/0000296 A1* | 1/2008 | Johnson | G01C 19/5719 73/514.18 |
| 2009/0165553 A1* | 7/2009 | Klemetti | G01C 19/5712 73/504.04 |
| 2010/0186505 A1* | 7/2010 | Sattler | G01C 19/574 73/504.12 |
| 2013/0186200 A1* | 7/2013 | Classen | G01C 19/5747 73/504.12 |
| 2013/0255377 A1* | 10/2013 | Furuhata | G01C 19/5719 73/504.12 |
| 2016/0146605 A1* | 5/2016 | Furuhata | G01C 19/5712 73/504.12 |
| 2016/0169933 A1* | 6/2016 | Ohms | G01C 19/5726 73/1.37 |
| 2017/0074654 A1* | 3/2017 | Furuhata | G01C 19/574 |
| 2018/0112982 A1* | 4/2018 | Takizawa | G01C 19/5747 |
| 2018/0306581 A1* | 10/2018 | Furuhata | B81B 3/0078 |
| 2019/0154446 A1* | 5/2019 | Komizo | G01C 19/5769 |
| 2019/0187171 A1* | 6/2019 | Takizawa | G01P 15/0802 |

FOREIGN PATENT DOCUMENTS

| | | |
|---|---|---|
| JP | 2007-304099 | 11/2007 |
| JP | 2009-175079 | 8/2009 |
| JP | 2014-134549 | 7/2014 |
| JP | 2018-185188 | 11/2018 |

\* cited by examiner

FIG. 8
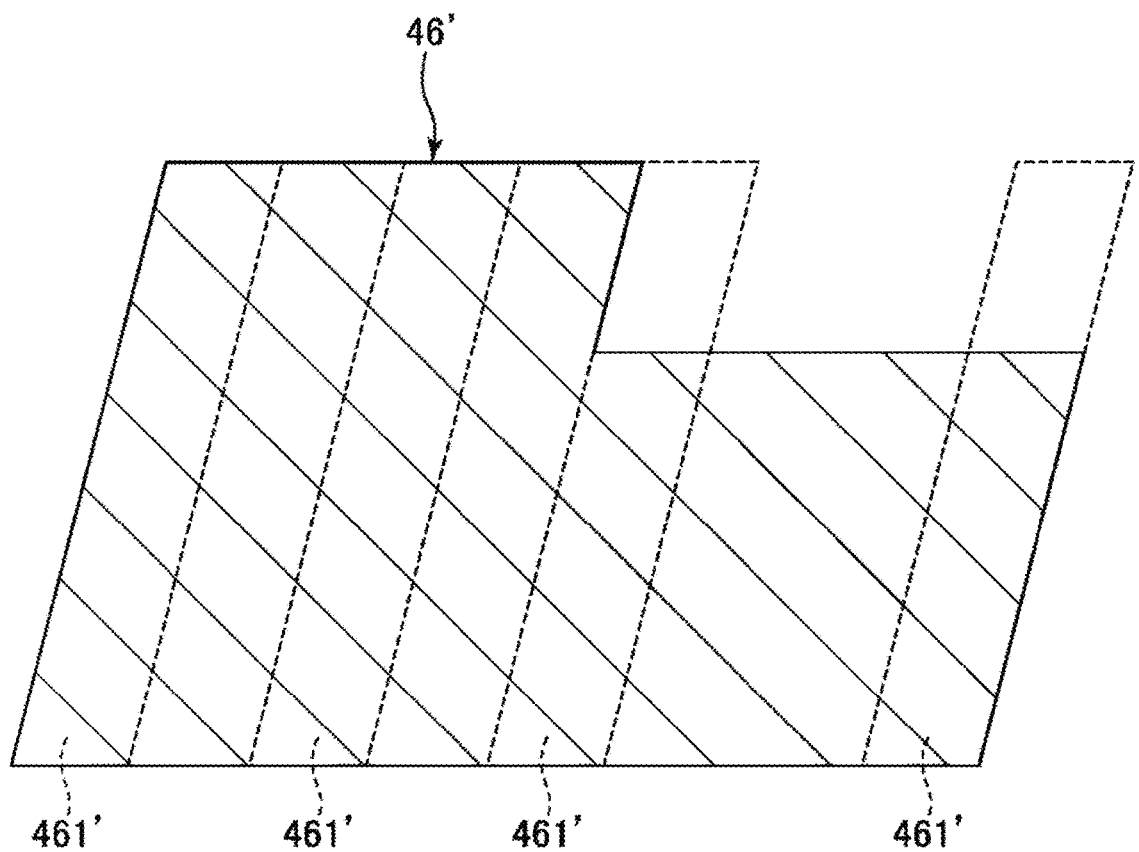
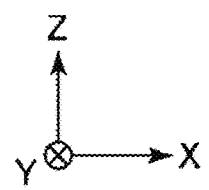

FIG. 11

| TYPE OF SPRING (t = 25 μm) | | | | CUTOUT K | | AMOUNT OF QUADRATURE DISPLACEMENT (μm) | AMOUNT OF QUADRATURE REDUCTION |
|---|---|---|---|---|---|---|---|
| INNER DETECTION SPRING | OUTER DETECTION SPRING | CONNECTION SPRING | DRIVE SPRING | DEPTH (μm) | LENGTH (μm) | | |
| ABSENCE OF THIN PORTION | ABSENCE OF THIN PORTION | ABSENCE OF THIN PORTION | ABSENCE OF THIN PORTION | | | -0.059 | 0.143 |
| PRESENCE OF THIN PORTION | ABSENCE OF THIN PORTION | ABSENCE OF THIN PORTION | ABSENCE OF THIN PORTION | 9 | 60 | 0.084 | 0.013 |
| ABSENCE OF THIN PORTION | PRESENCE OF THIN PORTION | ABSENCE OF THIN PORTION | ABSENCE OF THIN PORTION | 9 | 60 | -0.046 | 0.016 |
| ABSENCE OF THIN PORTION | ABSENCE OF THIN PORTION | PRESENCE OF THIN PORTION | ABSENCE OF THIN PORTION | 9 | 60 | -0.043 | 0.004 |
| ABSENCE OF THIN PORTION | ABSENCE OF THIN PORTION | ABSENCE OF THIN PORTION | PRESENCE OF THIN PORTION | 9 | 60 | -0.055 | 0.047 |
| PRESENCE OF THIN PORTION | ABSENCE OF THIN PORTION | ABSENCE OF THIN PORTION | ABSENCE OF THIN PORTION | 4 | 60 | -0.012 | 0.028 |
| PRESENCE OF THIN PORTION | ABSENCE OF THIN PORTION | ABSENCE OF THIN PORTION | ABSENCE OF THIN PORTION | 2 | 60 | -0.031 | 0.029 |
| ABSENCE OF THIN PORTION | PRESENCE OF THIN PORTION | ABSENCE OF THIN PORTION | PRESENCE OF THIN PORTION | 9 | DRIVE SPRING: 200 OUTER DETECTION SPRING: 30 | -0.030 | 0.044 |
| PRESENCE OF THIN PORTION | PRESENCE OF THIN PORTION | ABSENCE OF THIN PORTION | PRESENCE OF THIN PORTION | 4 | DRIVE SPRING: 200 OUTER DETECTION SPRING: 30 INNER DETECTION SPRING: 30 | 0.015 | 0.050 |
| PRESENCE OF THIN PORTION | PRESENCE OF THIN PORTION | PRESENCE OF THIN PORTION | PRESENCE OF THIN PORTION | 4 | DRIVE SPRING: 60 OUTER DETECTION SPRING: 30 INNER DETECTION SPRING: 30 CONNECTION SPRING: 60 | 0.009 | |

FIG. 20
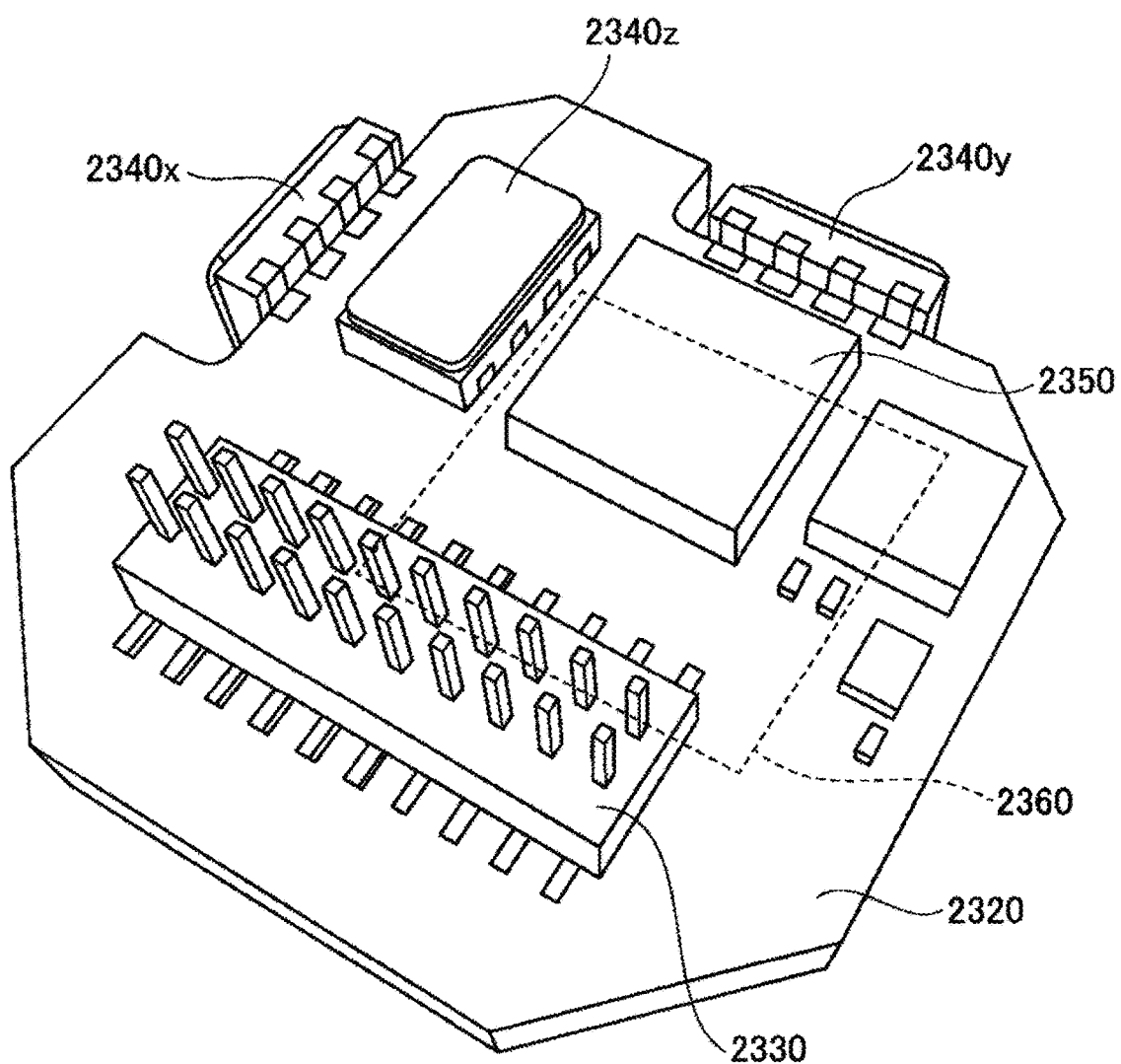

INERTIAL SENSOR, ELECTRONIC DEVICE, AND VEHICLE

The present application is based on, and claims priority from JP Application Serial Number 2018-222491, filed Nov. 28, 2018, the disclosure of which is hereby incorporated by reference herein in its entirety.

BACKGROUND

1. Technical Field

The present disclosure relates to an inertial sensor, an electronic device, and a vehicle.

2. Related Art

An angular velocity sensor described in JP-A-2009-175079 includes a movable drive electrode, a fixed drive electrode for vibrating the movable drive electrode, a movable detection electrode coupled to the movable drive electrode via a vibration amount amplification portion, and a fixed detection electrode disposed so as to face the movable detection electrode. In such an angular velocity sensor, an electrostatic attraction force is generated between the movable drive electrode and the fixed drive electrode to vibrate the movable detection electrode together with the movable drive electrode in the Y-axis direction (this vibration mode is referred to as "drive vibration mode"). In this state, when an angular velocity around the X-axis is applied, the movable detection electrode vibrates in the Z-axis direction (this vibration mode is referred to as a "detection vibration mode") by the Coriolis force, and an angular velocity around the X-axis can be detected based on a capacitance between the movable detection electrode and the fixed detection electrode, which changes accompanying the vibration.

Such an angular velocity sensor can be formed, for example, by using the Bosch process which is a deep groove etching technique of silicon described in JP-T-7-503815. The deep groove etching technique of silicon is a technique of forming a deep groove in silicon by alternately switching between two systems of gases of $SF_6$ which is etching gas and $C_4F_8$ which is side wall protective film forming gas and alternately repeating an etching process and a side wall protective film forming process. According to such a deep groove etching technique, it is possible to form a groove excellent in verticality of a groove side surface and having a high aspect ratio.

However, in a case of using the deep groove etching technique described in JP-T-7-503815, a through-hole may be formed in an oblique direction inclined with respect to the normal direction of an etched surface of an etched wafer, for example, depending on a position of the etched wafer in a chamber or the like. As such, when the through-hole is obliquely formed, a cross-sectional shape of the vibration amount amplification portion is shifted from a rectangle. As such, when the cross-sectional shape of the vibration amount amplification portion is shifted from the rectangle, the movable detection electrode vibrates in the Y-axis direction as well as in the Z-axis direction in the drive vibration mode, and detection characteristics of the angular velocity are deteriorated.

Vibration (unnecessary vibration) of the movable detection electrode in the Z-axis direction in the drive vibration mode is also called "quadrature", and a noise signal caused by the quadrature is also called a "quadrature signal".

SUMMARY

An inertial sensor according to an aspect of the present disclosure includes, assuming that three axes orthogonal to each other are an X-axis, a Y-axis, and a Z-axis, a substrate, a first detection movable body and a second detection movable body which overlap the substrate in a direction along the Z-axis and are disposed side by side in a direction along the X-axis, a first detection spring that supports the first detection movable body to be displaceable in the direction along the X-axis, a second detection spring that supports the second detection movable body to be displaceable in the direction along the X-axis, a first drive portion that drives the first detection movable body with a drive component in the direction along the X-axis, a second drive portion that drives the second detection movable body with a drive component in the direction along the X-axis, a first fixed detection electrode disposed on the substrate and facing the first detection movable body, and a second fixed detection electrode disposed on the substrate and facing the second detection movable body, in which the first detection spring and the second detection spring are provided with a first thin portion thinner than a thickness of the first detection movable body and the second detection movable body in the direction along the Z-axis.

BRIEF DESCRIPTION OF THE DRAWINGS

FIG. 8 is a cross-sectional view illustrating a state in which a plurality of beams included in the inner detection spring are taken as one beam in total.

FIG. 11 is a table illustrating a quadrature suppression effect.

FIG. 20 is a perspective view of a substrate included in the inertia measurement device illustrated in FIG. 19.

DESCRIPTION OF EXEMPLARY EMBODIMENTS

Hereinafter, an inertial sensor, an electronic device, and a vehicle according to the present disclosure will be described in detail based on embodiments illustrated in the accompanying drawings.

First Embodiment

Figure 1:
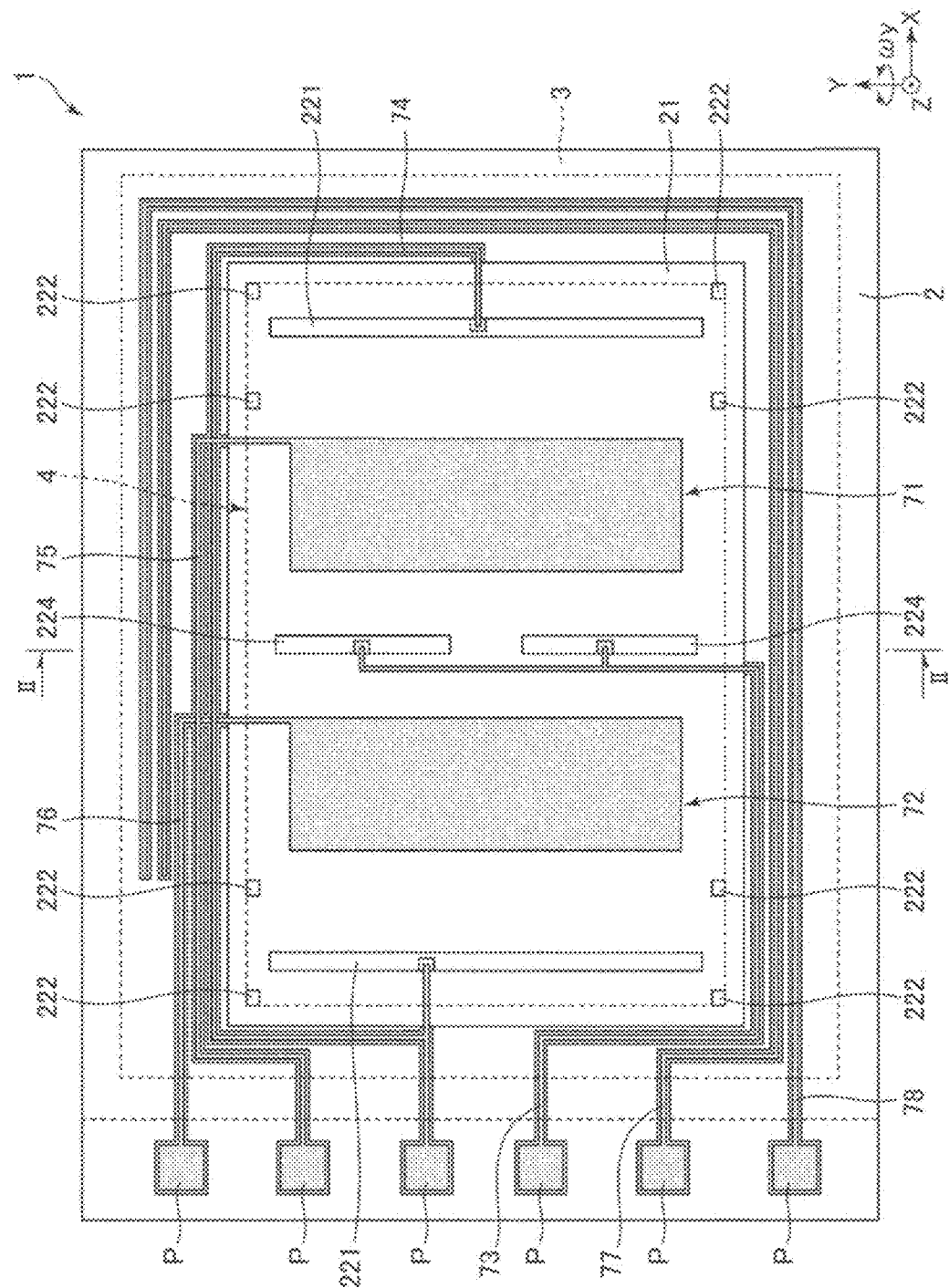
FIG. 1 is a plan view illustrating an inertial sensor according to a first embodiment.
Figure 2:
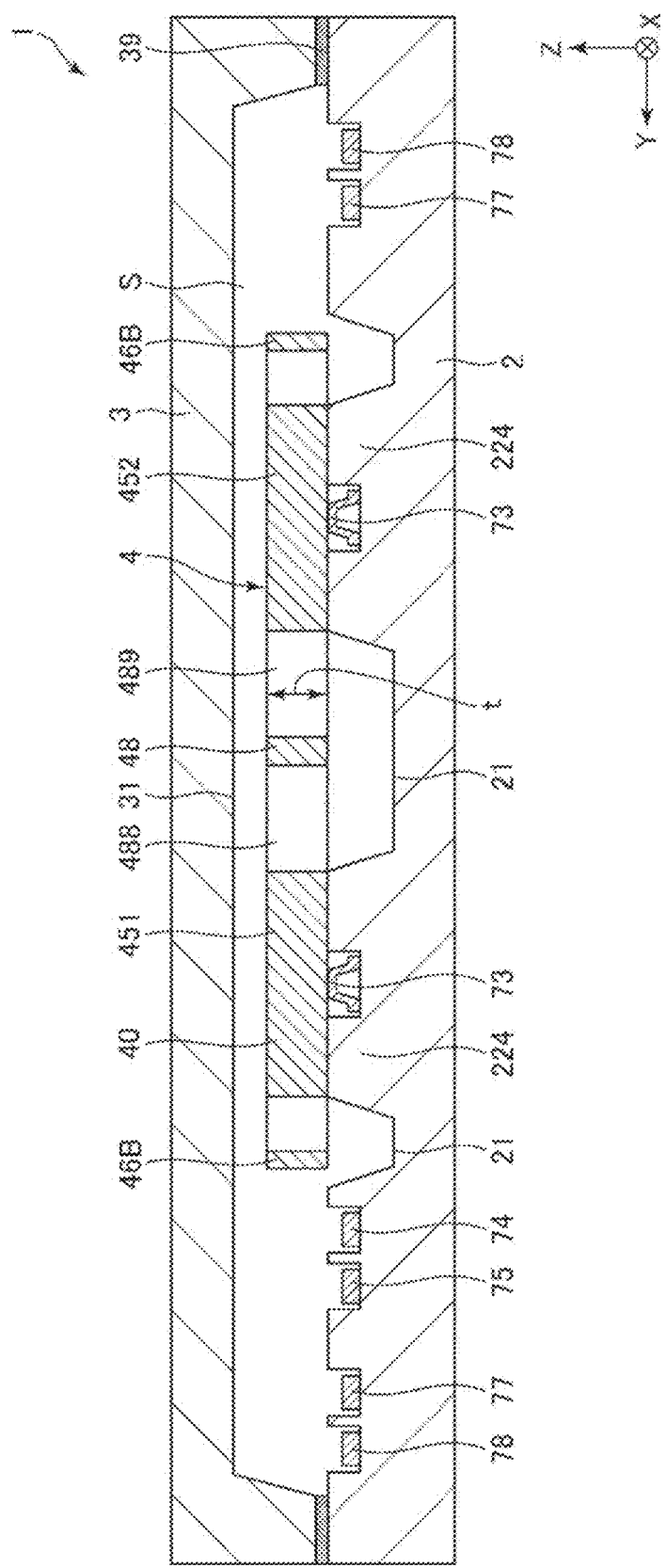
FIG. 2 is a cross-sectional view taken along line II-II in FIG. 1.
Figure 3:
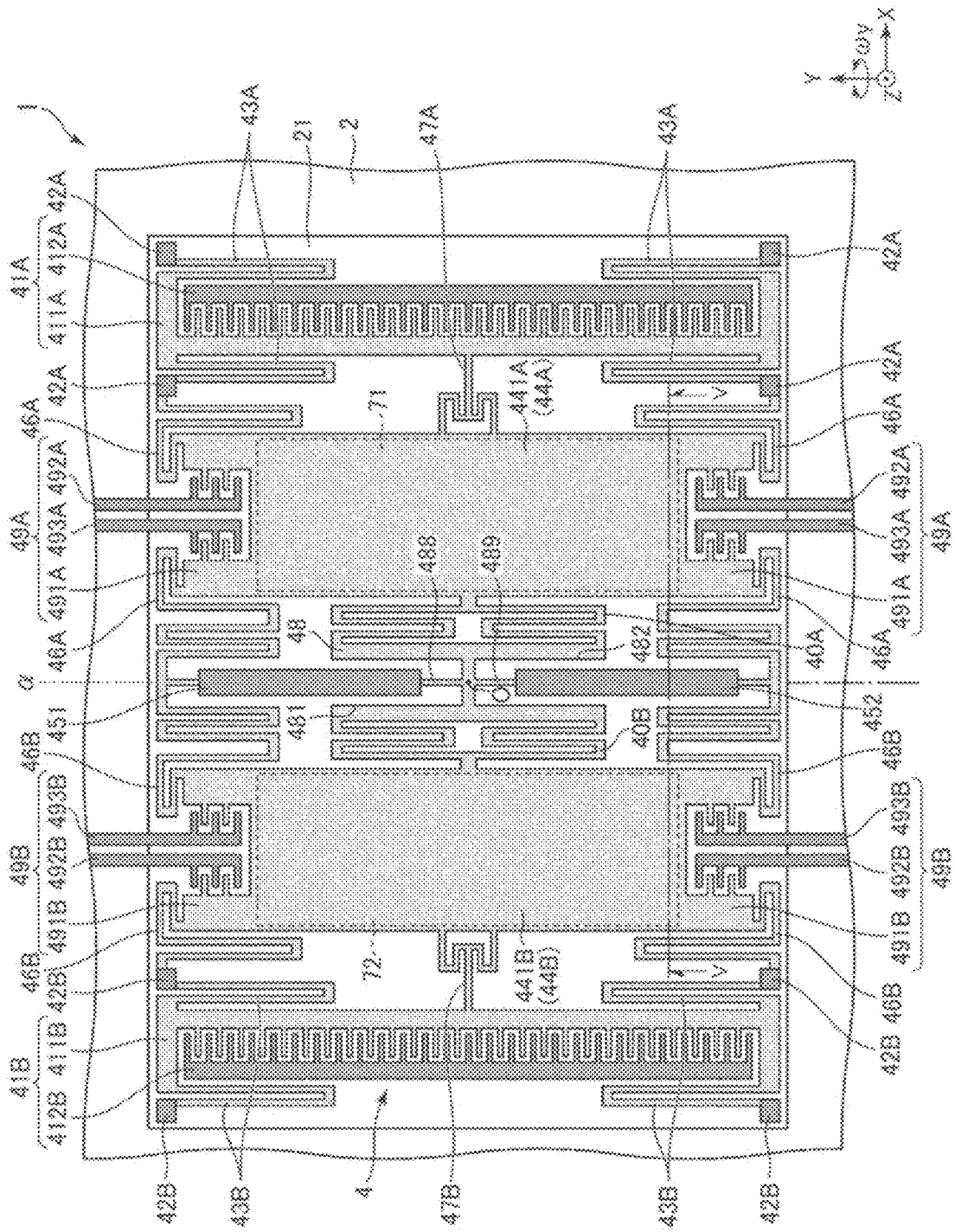
FIG. 3 is a plan view illustrating a sensor element included in the inertial sensor of FIG. 1.
Figure 4:
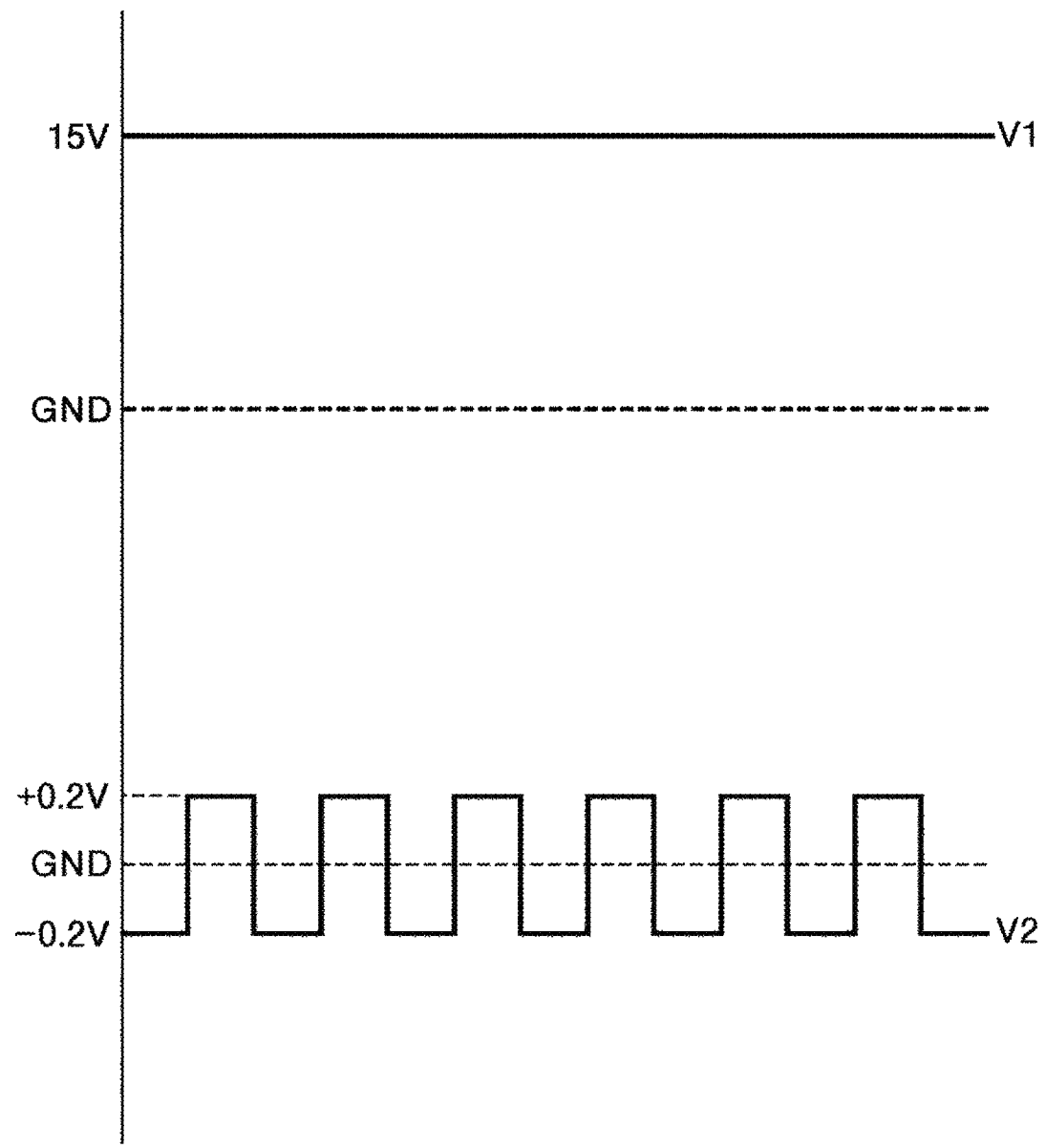
FIG. 4 is a diagram illustrating a voltage to be applied to the inertial sensor of FIG. 1.
Figure 5:
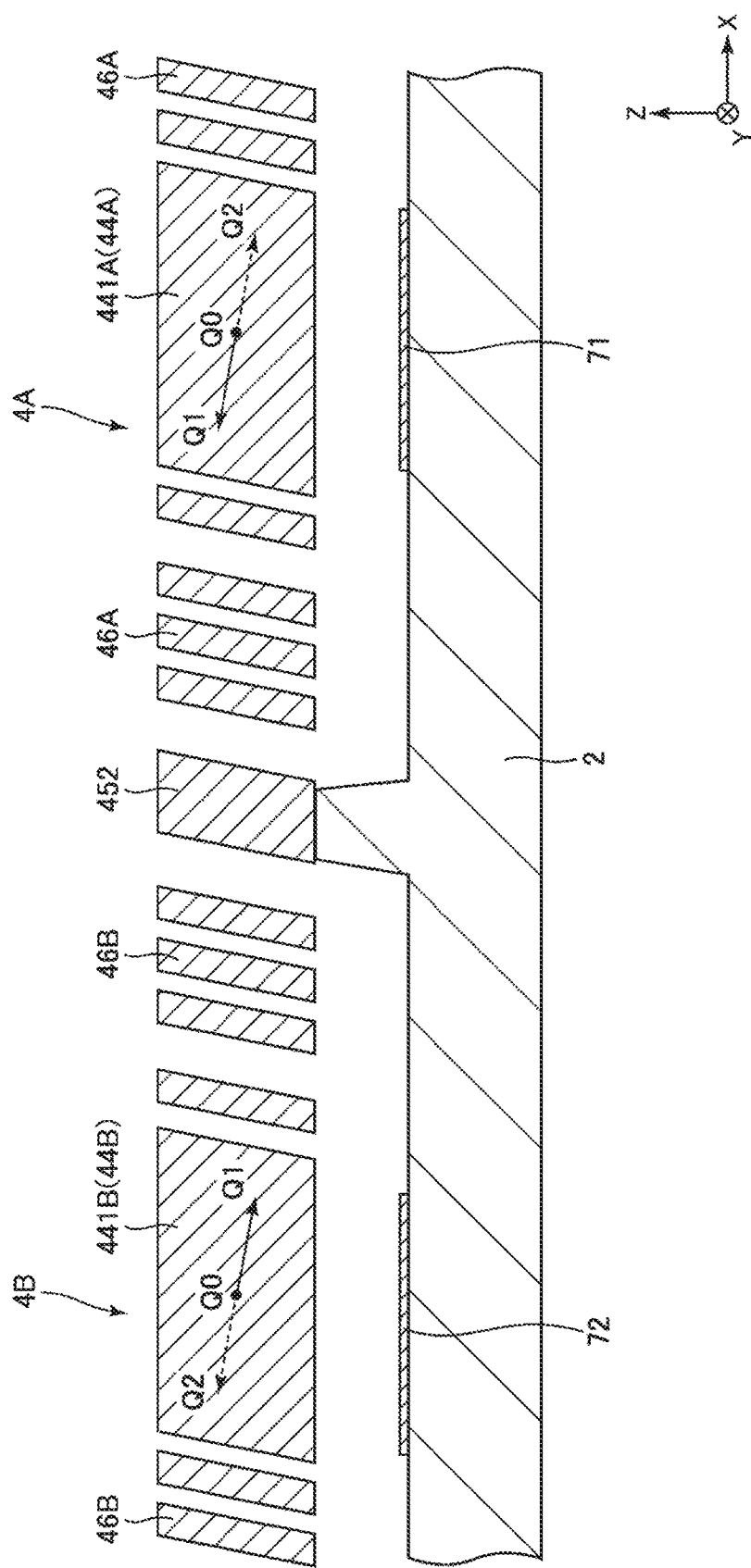
FIG. 5 is a cross-sectional view taken along line V-V in FIG. 3, illustrating a drive vibration mode of the sensor element.
Figure 6:
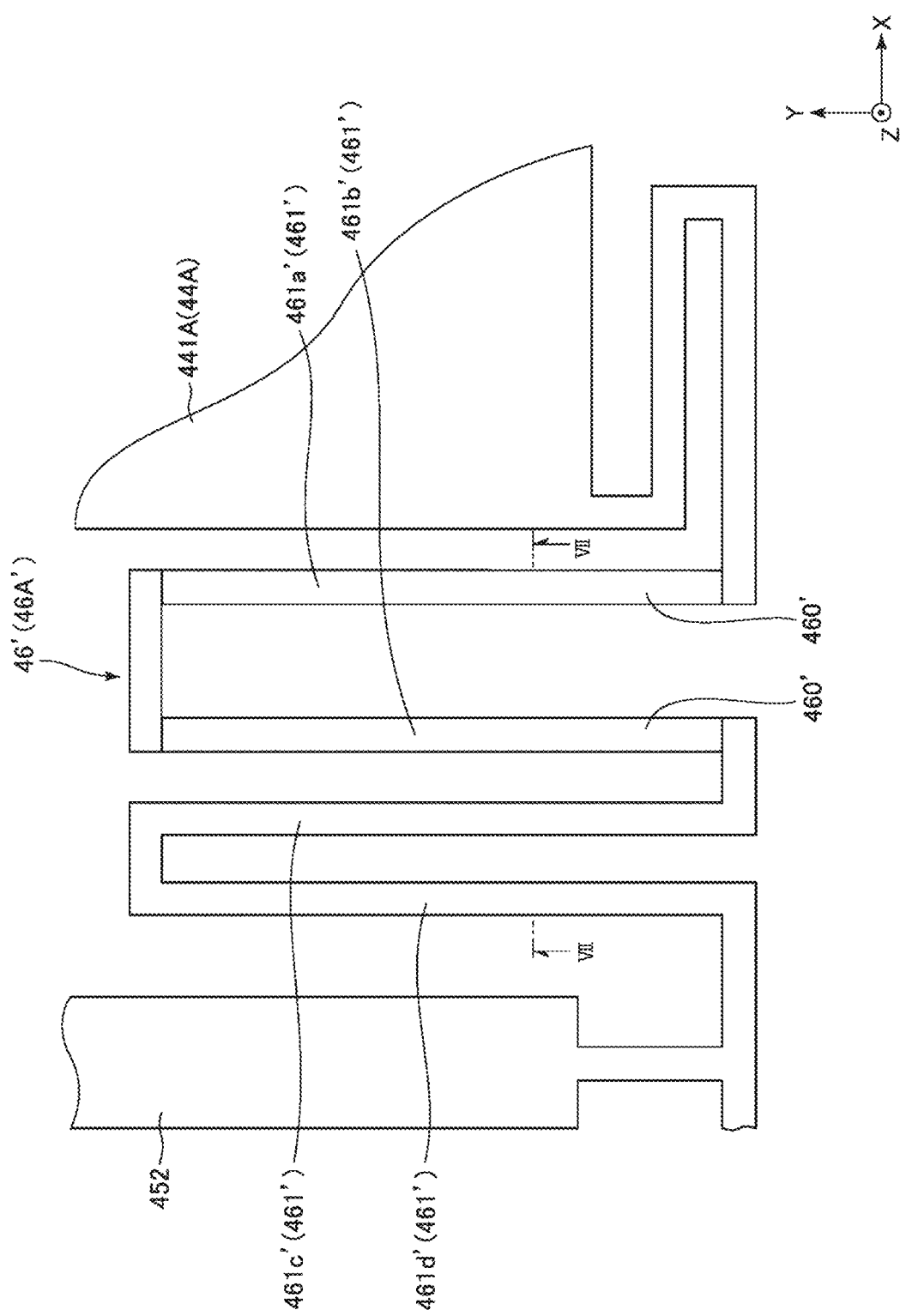
FIG. 6 is a plan view illustrating an inner detection spring.
Figure 7:
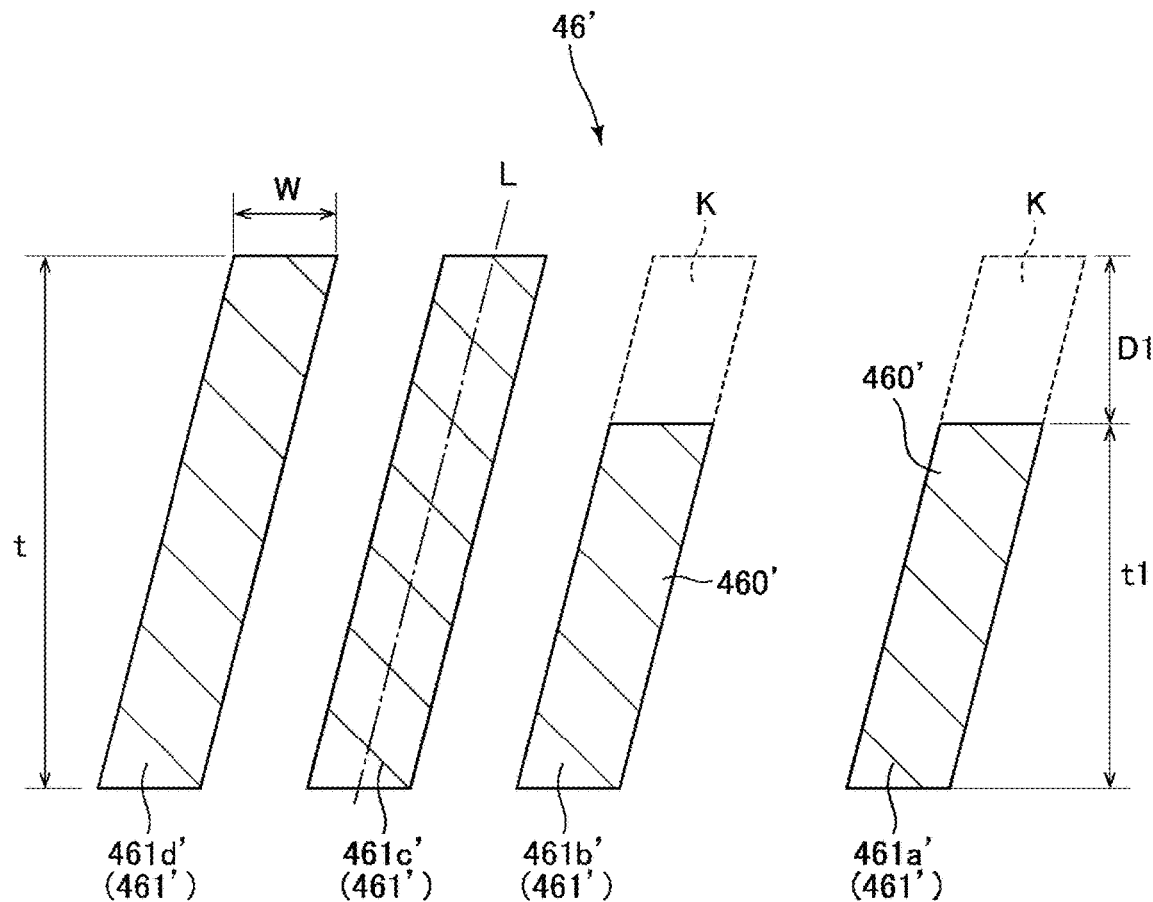
FIG. 7 is a cross-sectional view taken along line VII-VII in FIG. 6.
Figure 9:
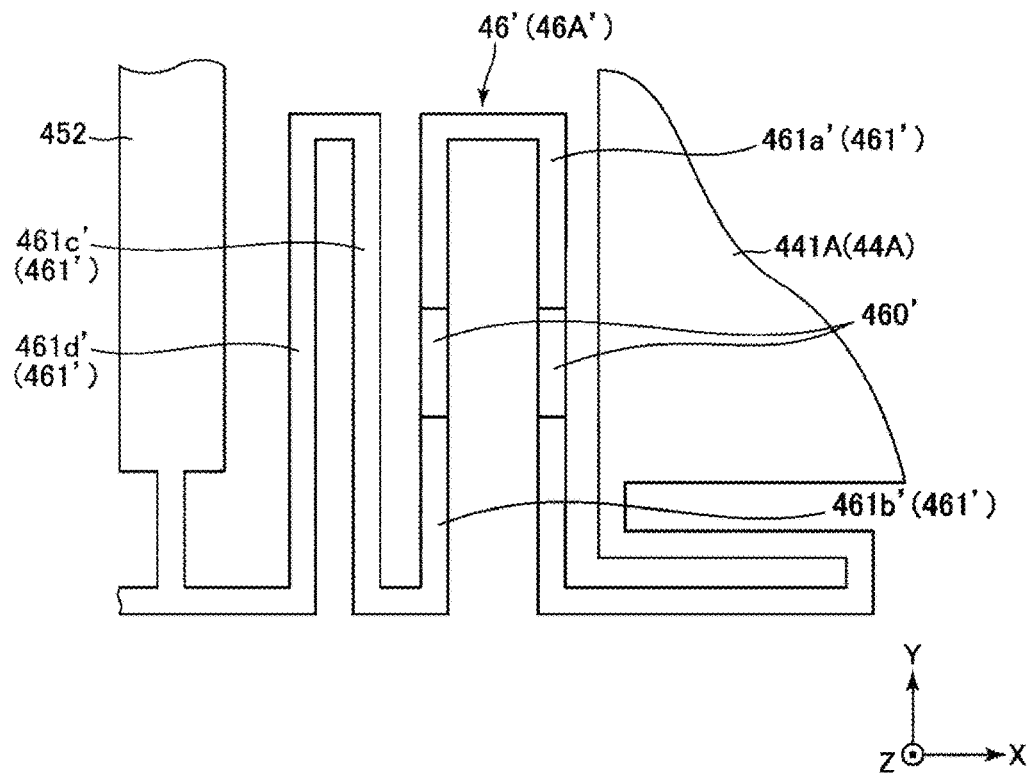
FIG. 9 is a plan view illustrating a modification example of the inner detection spring.
Figure 10:
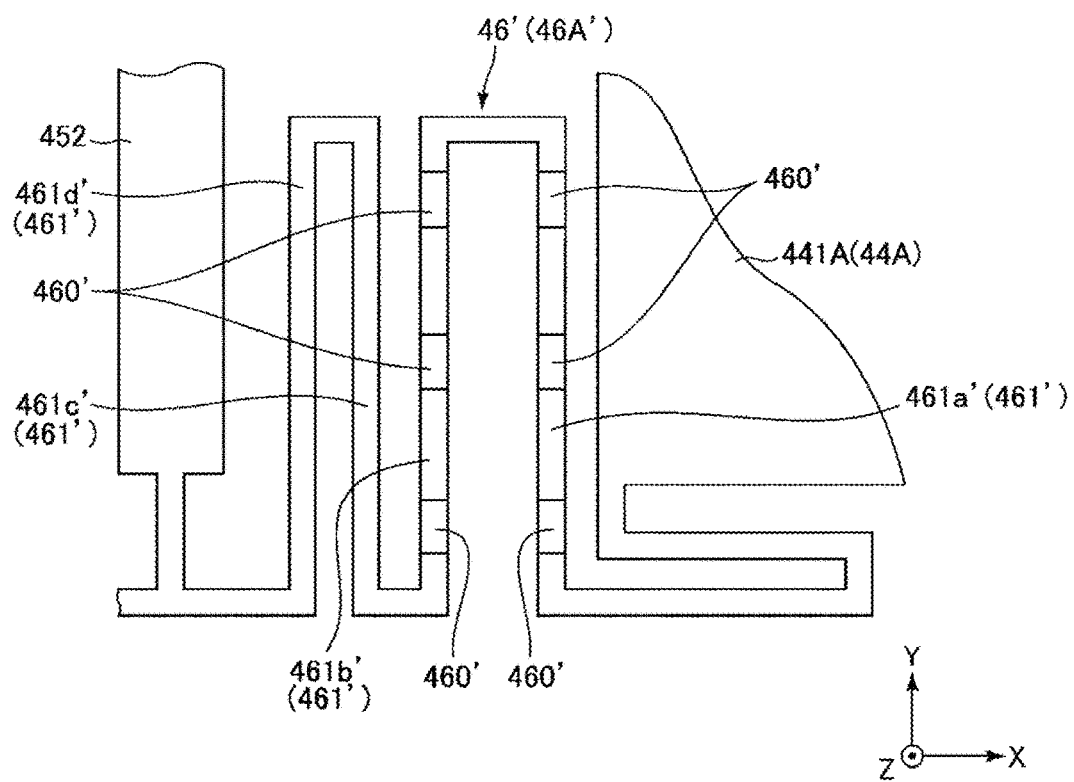
FIG. 10 is a plan view illustrating another modification example of the inner detection spring.

FIG. 1 is a plan view illustrating an inertial sensor according to a first embodiment. FIG. 2 is a cross-sectional view taken along line II-II in FIG. 1. FIG. 3 is a plan view illustrating a sensor element included in the inertial sensor of FIG. 1. FIG. 4 is a diagram illustrating a voltage to be applied to the inertial sensor of FIG. 1. FIG. 5 is a cross-sectional view taken along line V-V in FIG. 3, illustrating a drive vibration mode of the sensor element. FIG. 6 is a plan view illustrating an inner detection spring. FIG. 7 is a cross-sectional view taken along line VII-VII in FIG. 6. FIG. 8 is a cross-sectional view illustrating a state in which a plurality of beams included in the inner detection spring are taken as one beam in total. FIGS. 9 and 10 are plan views illustrating modification examples of the inner detection spring. FIG. 11 is a table illustrating a quadrature suppression effect.

In each drawing, the X-axis, Y-axis, and Z-axis are illustrated as three axes orthogonal to each other. A direction along the X-axis, that is, a direction parallel to the X-axis is referred to as an "X-axis direction", a direction along the Y-axis is referred as a "Y-axis direction", and a direction along the Z-axis is referred to as a "Z-axis direction". A tip end side of the arrow of each axis is also referred to as a "plus side", and the opposite side is also referred to a "minus side". In addition, the plus side in the Z-axis direction is also referred to as "upper", and the minus side in the Z-axis direction is also referred to as "lower". In the specification of the present application, the term "orthogonal to" includes not only a case where constituent elements intersect at 90° but also a case where the constituent elements intersect at an angle slightly inclined from 90°, for example, within a range of 90°±5°.

The inertial sensor 1 illustrated in FIG. 1 is an angular velocity sensor capable of measuring the angular velocity ωy around the Y-axis. The inertial sensor 1 includes a substrate 2, a lid 3, and a sensor element 4.

The substrate 2 includes a concave portion 21 which is open to the upper surface. The concave portion 21 functions as a relief portion for preventing contact between the sensor element 4 and the substrate 2. The substrate 2 includes a plurality of mounts 221, 222, and 224 protruding from the bottom surface of the concave portion 21. The sensor element 4 is bonded to the upper surfaces of the mounts 221, 222, and 224.

Fixed detection electrodes 71 and 72 are disposed on the bottom surface of the concave portion 21. The substrate 2 includes a groove portion which is open to the upper surface, and wirings 73, 74, 75, 76, 77, and 78 are disposed thereon. One end portions of the wirings 73, 74, 75, 76, 77, and 78 are exposed to the outside of the lid 3, respectively, and function as electrode pads P that makes electrical coupling with an external apparatus.

As such a substrate 2, for example, a glass substrate made of a glass material containing alkali metal ions such as sodium ions, specifically, bororosilicate glass such as Tempax glass (registered trademark) and Pyrex glass (registered trademark) can be used. However, a constituent material of the substrate 2 is not particularly limited, and a silicon substrate, a ceramic substrate, and the like may be used.

As illustrated in FIG. 2, the lid 3 has a concave portion 31 which opens to the lower surface. The lid 3 is bonded to the upper surface of the substrate 2 so as to accommodate the sensor element 4 in the concave portion 31. An accommodation space S in which the sensor element 4 is accommodated is formed inside the lid 3 and the substrate 2. The accommodation space S may be in a reduced pressure state, particularly in a vacuum state. As a result, the viscous resistance decreases, and the sensor element 4 can efficiently vibrate.

As such a lid 3, for example, a silicon substrate can be used. However, the lid 3 is not particularly limited, and for example, a glass substrate or a ceramic substrate may be used as the lid 3. The bonding method between the substrate 2 and the lid 3 is not particularly limited, and may be appropriately selected depending on the materials of the substrate 2 and the lid 3. However, for example, anodic bonding, active bonding for bonding the bonding surfaces activated by plasma irradiation, bonding with a bonding material such as glass frit, diffusion bonding for bonding the metal films formed on the upper surface of the substrate 2 and the lower surface of the lid 3, and the like may be included. In the first embodiment, the substrate 2 and the lid 3 are bonded via a glass frit 39 which is low melting point glass.

The sensor element 4 is disposed in the accommodation space S and is bonded to the upper surfaces of the mounts 221, 222, and 224. The sensor element 4 can be formed by patterning a conductive silicon substrate 40 doped with, for example, impurities such as phosphorus (P), boron (B), arsenic (As) or the like by the Bosch process which is a deep groove etching technique. However, the method of forming the sensor element 4 is not limited to the Bosch process. A silicon substrate 40 has an equal thickness t over the entire area except for a part of detection springs 46A and 46B described later.

Hereinafter, a configuration of the sensor element 4 will be described with reference to FIG. 3. In the following description, a straight line intersecting with the center O of the sensor element 4 and extending in the Y-axis direction in a plan view in the Z-axis direction is also referred to as an "imaginary straight line α".

As illustrated in FIG. 3, the shape of the sensor element 4 is symmetrical with respect to the imaginary straight line α. Such a sensor element 4 includes two drive portions 41A and 41B disposed on both sides of the imaginary straight line α. The drive portion 41A is a first drive portion in the first embodiment and the drive portion 41B is a second drive portion in the first embodiment.

The drive portion 41A includes a comb teeth-shaped movable drive electrode 411A as a first movable drive electrode and a fixed drive electrode 412A as a first fixed drive electrode which is disposed in a comb-teeth shape and disposed to be engaged with the movable drive electrode 411A. Similarly, the drive portion 41B includes a comb teeth-shaped movable drive electrode 411B as a second movable drive electrode and a fixed drive electrode 412B as a second fixed drive electrode which is disposed in a comb-teeth shape and disposed to be engaged with the movable drive electrode 411B.

The fixed drive electrodes 412A and 412B are bonded to the upper surface of the mount 221, respectively, and are fixed to the substrate 2. The fixed drive electrodes 412A and 412B are electrically coupled to the wiring 74, respectively.

The sensor element 4 includes four fixed portions 42A disposed around the drive portion 41A and four fixed portions 42B disposed around the drive portion 41B. Each of the fixed portions 42A and 42B is bonded to the upper surface of the mount 222 and fixed to the substrate 2. The sensor element 4 includes four drive springs 43A as a first drive spring for coupling the respective fixed portions 42A and the movable drive electrode 411A and four drive springs 43B as a second drive spring for coupling the respective fixed portions 42B and the movable drive electrode 411B.

The sensor element 4 includes a detection portion 44A positioned between the drive portion 41A and the imaginary straight line α, and a detection portion 44B positioned between the drive portion 41B and the imaginary straight line α. The detection portion 44A is configured by a plate-shaped movable detection electrode 441A which is a first detection movable body. Similarly, the detection portion 44B is configured by a plate-shaped movable detection electrode 441B which is a second movable detection movable body. Further, on the bottom surface of the concave portion 21, a fixed detection electrode 71 as a first fixed detection electrode facing the movable detection electrode 441A and electrically coupled to the wiring 75 and a fixed detection electrode 72 as a second fixed detection electrode facing the movable detection electrode 441B and electrically coupled to the wiring 76 are disposed. When the inertial sensor 1 is driven, a capacitance Ca is formed between the movable detection electrode 441A and the fixed detection electrode 71 and a capacitance Cb is formed between the movable detection electrode 441B and the fixed detection electrode 72.

The sensor element 4 includes a frame 48 as a coupling portion which is positioned at the center portion thereof, that is, between detection portions 44A and 44B. The frame 48 has an "H" shape and includes a defective portion 481 positioned at the plus side in the Y-axis direction and a defective portion 482 positioned at the minus side in the Y-axis direction. A fixed portion 451 extending in the Y-axis direction is disposed inside and outside of the defective portion 481, and a fixed portion 452 extending in the Y-axis direction is disposed inside and outside the defective portion 482. The fixing portions 451 and 452 are electrically coupled to the wiring 73, respectively.

The sensor element 4 includes four detection springs 46A as the first detection springs for coupling the movable detection electrode 441A and the fixed portions 42A, 451, and 452, and four detection springs 46B as the second detection springs for coupling the movable detection electrode 441B and the fixed portions 42B, 451, and 452.

Here, among the four detection springs 46A, one that is positioned at the minus side in the X-axis direction with respect to the movable detection electrode 441A, that is, on the movable detection electrode 441B side, and couples the fixed portions 451 and 452 and the movable detection electrode 441A is also referred to as an "inner detection spring 46A'" as a first inner detection spring and one that is positioned at the plus side in the X-axis direction with respect to the movable detection electrode 441A, that is, on a side opposite to the movable detection electrode 441B, and couples fixed portion 42A and the movable detection electrode 441A is also referred to as an "outer detection spring 46A"" "as a first outer detection spring. Similarly, among the four detection springs 46B, one that is positioned at the plus side in the X-axis direction with respect to the movable detection electrode 441B, that is, on the movable detection electrode 441A side and couples the fixed portions 451 and 452 and the movable detection electrode 441B is also referred to as "inner detection spring 46B'" as a second inner detection spring and one that is positioned at the minus side in the X-axis direction with respect to the movable detection electrode 441B, that is, on a side opposite to the movable detection electrode 441A and couples the fixed portions 42B and the movable detection electrode 441B is also referred to as an "outer detection spring 46B'" as a second outer detection spring.

As such, as the detection spring 46A includes the inner detection spring 46A' and the outer detection spring 46A", the movable detection electrode 441A can be supported from both sides by the detection spring 46A, and the attitude of the movable detection electrode 441A is stabilized. Similarly, as the detection spring 46B includes the inner detection spring 46B' and the outer detection spring 46B", the movable detection electrode 441B can be supported from both sides by the detection spring 46B, and the attitude of the movable detection electrode 441B is stabilized.

The sensor element 4 includes a coupling beam 47A as a first beam positioned between the movable drive electrode 411A and the movable detection electrode 441A and coupling the movable drive electrode 411A and the movable detection electrode 441A and includes a coupling beam 47B as a second beam positioned between the movable drive electrode 411B and the movable detection electrode 441B and coupling the movable drive electrode 411B and the movable detection electrode 441B. Each of the coupling beams 47A and 47B is bent in the middle and is elastically deformable in the Z-axis direction. In the following description, an aggregate of the movable drive electrode 411A, the movable detection electrode 441A, and the coupling beam 47A is also referred to as a "movable body 4A", and an aggregate of the movable drive electrode 411B, the movable detection electrode 441B, and the coupling beam 47B is also referred to as a "movable body 4B".

The sensor element 4 includes a frame spring 488 which is positioned between the fixed portion 451 and the frame 48 and couples these components, and a frame spring 489 which is positioned between the fixed portion 452 and the frame 48 and couples these components.

The sensor element 4 includes a connection spring 40A as a first connection spring coupling the frame 48 and the movable detection electrode 441A and a connection spring 40B as a second connection spring coupling the frame 48 and the movable detection electrode 441B. The connection spring 40A supports the movable detection electrode 441A together with the detection spring 46A, and the connection spring 40B supports the movable detection electrode 441B together with the detection spring 46B. By disposing the connection springs 40A and 40B in addition to the detection springs 46A and 46B, the movable detection electrodes 441A and 441B can be supported in a more stable attitude, and unnecessary vibration of the movable detection electrodes 441A and 441B can be reduced.

For example, when a voltage V1 illustrated in FIG. 4 is applied to the movable bodies 4A and 4B via the wiring 73 and a voltage V2 illustrated in FIG. 4 is applied to the fixed drive electrodes 412A and 412B via the wiring 74, due to electrostatic attraction acting therebetween, the movable bodies 4A and 4B vibrate in opposite phases in such a way that the movable bodies 4A and 4B repeat approaching and separating from each other in the X-axis. In the following, this vibration mode is also referred to as a "drive vibration mode". When the angular velocity ωy is applied to the sensor element 4 in a state where the movable body 4A and the movable body 4B are driven in the drive vibration mode, the movable detection electrodes 441A and 441B vibrate in opposite phases in the Z-axis direction due to the Coriolis force, and the capacitances Ca and Cb change according to this vibration. In the following, this vibration mode is also referred to as a "detection vibration mode". For that reason, the angular velocity ωy received by the sensor element 4 can be obtained based on changes in the capacitances Ca and Cb.

In the detection vibration mode, when the electrostatic capacity Ca increases, the electrostatic capacity Cb decreases, and on the contrary, when the electrostatic capacity Ca decreases, the capacitance Cb increases. For that reason, by performing difference computation, that is, subtraction processing: (Ca−Cb) between a detection signal (signal corresponding to magnitude of the capacitance Ca) obtained from the wiring 75 and a detection signal (signal corresponding to magnitude of the capacitance Cb) obtained from the wiring 76, noise can be canceled, and the angular velocity ωy can be detected more accurately.

The voltages V1 and V2 are not particularly limited as long as the drive vibration mode can be excited. In the inertial sensor 1 of the first embodiment, although an electrostatic drive method is used in which the drive vibration mode is excited by electrostatic attraction force, a method of exciting the drive vibration mode is not particularly limited, and for example, a piezoelectric drive method, an electromagnetic drive method using a Lorentz force of a magnetic field, or the like can also be applied.

The sensor element 4 includes monitor portions 49A and 49B for detecting vibration states of the movable bodies 4A and 4B in the drive vibration mode. The monitor portion 49A includes a comb-teeth shaped movable monitor electrode 491A which is disposed on the movable detection electrode 441A and fixed monitor electrodes 492A and 493A which are disposed in a comb-teeth shape and disposed to be engaged with the movable monitor electrode 491A. Similarly, the monitor portion 49B includes a comb-teeth shaped movable monitor electrode 491B which is disposed on the movable detection electrode 441B and fixed monitor electrodes 492B and 493B which are disposed in a comb-teeth shape and disposed to be engaged with the movable monitor electrode 491B. The fixed monitor electrodes 492A, 493A, 492B, and 493B are respectively drawn out to the outside of the concave portion 21 and bonded to the upper surface of the substrate 2, and are fixed to the substrate 2.

The fixed monitor electrodes 492A and 492B are electrically coupled to the wiring 77, and the fixed monitor electrodes 493A and 493B are electrically coupled to the wiring 78. When the inertial sensor 1 is driven, a capacitance Cc is formed between the movable monitor electrode 491A and the fixed monitor electrode 492A and between the movable monitor electrode 491B and the fixed monitor electrode 492B and a capacitance Cd is formed between the movable monitor electrode 491A and the fixed monitor electrode 493A and the movable monitor electrode 491B and the fixed monitor electrode 493B. When the movable bodies 4A and 4B vibrate in the X-axis direction in the drive vibration mode, the capacitances Cc and Cd change according to the vibration. For that reason, a detection signal is output based on changes in the capacitances Cc and Cd, and a vibration state of the movable bodies 4A and 4B can be detected based on the output detection signal.

The vibration state of the movable bodies 4A and 4B detected using the outputs from the monitor portions 49A and 49B is fed back to a drive circuit that applies the voltage V2 to the fixed drive electrodes 412A and 412B. The drive circuit changes the frequency, amplitude, and the duty ratio of the voltage V2 so that amplitudes of the movable bodies 4A and 4B become target values. With this configuration, the movable bodies 4A and 4B can be vibrated in a target vibration state, and detection accuracy of the angular velocity ωy is improved.

Here, ideally, in the drive vibration mode, the movable detection electrodes 441A and 441B may move in parallel in the X-axis direction. In other words, in the drive vibration mode, the movable detection electrodes 441A and 441B may not displaced in the Z-axis direction. This is because when the movable detection electrodes 441A and 441B are displaced in the Z-axis direction, the gap between the movable detection electrodes 441A and 441B and the fixed detection electrodes 71 and 72 changes, and thus the capacitances Ca and Cb change even though the angular velocity ωy is not applied. With this configuration, a quadrature signal, which is a noise signal, is output, and this quadrature signal mixes in the detection signal, and the detection accuracy of the angular velocity ωy decreases.

In order to suppress vibration, that is, quadrature in the Z-axis direction of the movable detection electrodes 441A and 441B, each of the springs 40A, 40B, 43A, 43B, 46A, and 46B may be designed to have no vibration component in the Z-axis direction. Specifically, for example, as illustrated in FIG. 5, the cross sectional shape of each of the spring 40A, 40B, 43A, 43B, 46A, and 46B may be designed as a rectangle, in particular, a rectangle elongated in the Z-axis direction. With this configuration, each of the springs 40A, 40B, 43A, 43B, 46A, and 46B substantially does not contain the vibration component of the Z-axis direction, and can suppress the quadrature.

However, a shift may occur in the shape of the sensor element 4 due to processing errors, characteristics of a processing device, and the like, for example the cross-sectional shape of each of the spring 40A, 40B, 43A, 43B, 46A, and 46B may become a parallelogram, a trapezoid, a barrel shape, and the like, which is broken from a rectangle. As such, when the cross sectional shape of each of the springs 40A, 40B, 43A, 43B, 46A, and 46B is broken from the rectangle, that is, when the cross sectional shape thereof becomes asymmetric with respect to the Z-axis, each of the springs 40A, 40B, 43A, 43B, 46A, and 46B includes the vibration component in the Z-axis direction together with the vibration component in the X-axis direction. As illustrated in FIG. 5, the vibration directions of the movable detection electrodes 441A and 441B are inclined with respect to the X-axis, and the quadrature is likely to occur.

To address such a problem, in the inertial sensor 1, the quadrature in the drive vibration mode is suppressed by devising the shapes of the inner detection springs 46A' and 46B'. In the following, the configuration of the inner detection springs 46A' and 46B' will be described in detail. Hereinafter, the inner detection springs 46A' and 46B' will be collectively referred to as an "inner detection spring 46'". Since each of the four inner detection springs 46' has the same configuration, in the following, one inner detection spring 46' will be representatively described, and the description of the other inner detection springs 46' will be omitted.

As illustrated in FIG. 6, the inner detection spring 46' has a serpentine shape, and has a plurality of beams 461' aligned in the X-axis direction and extending in the Y-axis direction. Further, as illustrated in FIG. 7, the cross-sectional shape of each beam 461' viewed from the Y-axis direction is a substantial parallelogram whose thickness t in the Z-axis direction is larger than a width W in the X-axis direction and the major axis L of each beam 461' is inclined with respect to the Z-axis. The number of beams 461' is not particularly limited, but is four in the present embodiment. Here, from the design stage, the cross-sectional shape of each beam 461' may be a shape that is broken from a rectangle such as a substantial parallelogram, or may be a shape which was rectangular in design, but a shape, specifically, a parallelogram, a trapezoid, a barrel, or the like, of which the cross-sectional shape of each beam 461' is broken from the rectangle due to the processing error, the characteristics of the processing device as described above, and the like.

At least one of the four beams 461' is formed with a thin portion 460' which is a first thin portion thinner than the thickness t of the silicon substrate 40. In the first embodiment, a cutout K is formed on the upper surface side of beams 461a' and 461b', and a portion overlapping the cutout K constitutes the thin portion 460'. A thickness t1 of the thin portion 460' along the Z-axis direction is thinner than the thickness t of the silicon substrate 40 by a depth D1 of the cutout K. That is, t1=t−D1. As such, the vibration component in the Z-axis direction of the inner detection spring 46' can be reduced by providing the thin portion 460' in apart of the four beams 461'. For that reason, the quadrature of the movable detection electrodes 441A and 441B can be reduced as compared with the configuration without the thin portion 460'.

Specifically, among the four beams 461', the vibration component in the Z-axis direction of the inner detection spring 46' can be reduced by providing the thin portion 460' in at least one of the beams 461a' and 461b' positioned at the plus side in the X axis direction that is the tip end side in the inclination direction (X axis direction) of the major axis L, and on the contrary, the vibration component in the Z-axis direction of the inner detection spring 46' can be increased by providing the thin portion 460' in at least one of the beams 461c' and 461d' positioned at the minus side in the X-axis direction that is the rear end side in the inclination direction of the major axis L.

This is considered to be the same reason as that the vibration component in the Z-axis direction of the inner detection spring 46' can be reduced by removing an acute angle portion of the corners of the parallelogram when the four beams 461' are regarded as an integral beam, as illustrated in FIG. 8 and that the vibration component in the Z-axis direction of the inner detection spring 46' can be increased by removing an obtuse angle portion thereof.

Therefore, in the first embodiment, the thin portion 460' is provided on the beams 461a' and 461b' to reduce the vibration component in the Z-axis direction of the inner detection spring 46', thereby reducing the quadrature. The disposition of the thin portion 460' is not particularly limited as long as the vibration component in the Z-axis direction of the inner detection spring 46' can be reduced, and for example, the thin portion 460' may be provided only on the beam 461a' or may be provided only on the beam 461b'. The cutout K may be formed on the lower surface side of the beams 461c' and 461d' to provide the thin portion 460'.

As such, the disposition of the thin portion 460' is not particularly limited as long as the vibration component in the Z-axis direction of the inner detection spring 46' can be reduced, but the thin portion 460' may be provided on the beam 461a' positioned closest to the tip end side of the plus side in the X axis direction, which is the inclination direction of the major axis L. This is because the amount of reduction of the vibration component in the Z-axis direction of the inner detection spring 46' due to provision of the thin portion 460' is larger as the beam is positioned closer to the tip end side in the inclination direction of the major axis L. That is, providing the thin portion 460 on the beam 461a' can greatly reduce the vibration component in the Z-axis direction more than providing the thin portion 460' on the beam 461b'.

In the first embodiment, as illustrated in FIG. 6, the thin portion 460' provided on the beam 461a' is provided substantially throughout the extending direction of the beam 461a', but a formation region of the thin portion 460' is not particularly limited. For example, as illustrated in FIG. 9, the thin portion 460' may be provided in a part of the extending direction of the beam 461a', or as illustrated in FIG. 10, a plurality of thin portion 460' may be intermittently provided on the beams 461a'. The same applies to the case where the thin portion 460' is provided on the beam 461b'. Since the vibration component in the Z-axis direction of the inner detection spring 46' decreases as the formation region of the thin portion 460', that is, the length in the Y-axis direction, increases, the formation region of the thin portion 460' may be adjusted according to magnitude of the vibration component in the Z-axis direction included in the inner detection spring 46'.

The thickness t1 of the thin portion 460' is not particularly limited, but is preferably 0.5≤t1/t≤0.9, and more preferably 0.6≤t1/t≤0.8. With this configuration, the vibration component in the Z-axis direction of the inner detection spring 46' can be effectively reduced, and an excessive decrease in mechanical strength of the thin portion 460' can be suppressed. The thickness t1 may be the same or may vary along the longitudinal direction or the width direction of the beams 461a' and 461b'. In the latter case, the numerical value of the thickness t1 is an average value of the thicknesses along the longitudinal direction or the width direction thereof. The same applies to t2 described later.

Thus, description has been made on the one inner detection spring 46' as a representative. Since the inertial sensor 1 of the first embodiment includes four inner detection springs 46', the thin portions 460' may be formed for the respective inner detection springs 46' so that the vibration component in the Z-axis direction is sufficiently reduced, may be zero. That is, the shapes of the thin portion 460' may be different for each of the plurality of inner detection springs 46' or may be the same as each other. The thin portion 460' may not be formed for the inner detection spring 46' having substantially no vibration component in the Z-axis direction. Also, for example, the thin portion 460' may be disposed not only at the beam 461' but also at a connection portion coupling adjacent beams 461".

The thicknesses t1 of all the thin portions 460' formed on the four inner detection springs 46' are may be the same. With this configuration, since all the thin portions 460' can be formed in the same process, the manufacturing process of the inertial sensor 1 can be reduced.

Thus, the inertial sensor 1 of the first embodiment has been described. As described above, in the inertial sensor 1 according to the first embodiment, the thin portions 460' are formed on the inner detection springs 46A' and 46B', but this is because the effect of suppressing the quadrature is high compared to the case where similar thin portions are formed on other outer detection springs 46A" and 46B", drive springs 43A and 43B, and connection springs 40A and 40B. The table illustrated in FIG. 11 is a simulation result illustrating how much quadrature is reduced when the thin portions are formed on the inner detection springs 46A' and 46B', the thin portions are formed on the outer detection springs 46A" and 46B", the thin portions are formed on the drive springs 43A and 43B, and the thin portions are formed on the connection springs 40A and 40B. From this table, it can be seen that when the thin portions are formed on the inner detection springs 46A' and 46B', the quadrature is most reduced.

As can be seen from FIG. 11, among the respective springs 46A', 46B', 46A", 46B", 43A, 43B, 40A, and 40B, formation of the thin portions on the drive springs 43A and 43B has the lowest effect on the reduction of quadrature as compared with the case where the thin portions are formed on the other springs 46A', 46B', 46A", 46B", 40A, and 40B. When the thin portions are formed in the drive springs 43A and 43B, the drive springs 43A and 43B are likely to be twisted, and drive of the movable drive electrodes 411A and 411B becomes unstable. As described above, forming the thin portions in the drive springs 43A and 43B has the disadvantage of destabilizing the vibration of the movable drive electrodes 411A and 411B as compared with the merit of reducing the quadrature. Accordingly, in the first embodiment, the thin portions are not provided in the drive springs 43A and 43B. That is, the entire area of the drive springs 43A and 43B is equal to the thickness t of the silicon substrate 40.

Thus, the inertial sensor 1 has been described. Such an inertial sensor 1 includes, assuming that three axes orthogonal to each other are an X-axis, a Y-axis, and a Z-axis, the substrate 2, the movable detection electrode 441A as the first detection movable body and the movable detection electrode 441B as the second detection movable body which overlap the substrate 2 in the direction along the Z-axis and are disposed side by side in a direction along the X-axis, the detection spring 46A as the first detection spring which supports the movable detection electrode 441A to be displaceable in the direction along the X-axis, the detection spring 46B as the second detection spring which supports the movable detection electrode 441B to be displaceable in the direction along the X-axis, the drive portion 41A as the first drive portion that drives the movable detection electrode 441A with the drive component in the direction along the X-axis, the drive portion 41B as the second drive portion that drives the movable detection electrode 441B with the drive component in the direction along the X-axis, the fixed detection electrode 71 as the first fixed detection electrode disposed on the substrate 2 and facing the movable detection electrode 441A, and the fixed detection electrode 72 as the second fixed detection electrode disposed on the substrate 2 and facing the movable detection electrode 441B. The detection springs 46A and 46B are provided with the thin portion 460' which is the first thin portion thinner than the thickness t of the movable detection electrodes 441A and 441B in the direction along the Z-axis. With this configuration, it is possible to effectively suppress the quadrature in the drive vibration mode. For that reason, the detection accuracy of the angular velocity ωy is improved.

As described above, the detection spring 46A includes the inner detection spring 46A' as the first inner detection spring positioned at the movable detection electrode 441B side of the movable detection electrode 441A and the outer detection spring 46A" as the first outer detection spring positioned at a side opposite to the movable detection electrode 441B side of the movable detection electrode 441A. Similarly, the detection spring 46B includes the inner detection spring 46B' as the second inner detection spring positioned at the movable detection electrode 441A side of the movable detection electrode 441B and the outer detection spring 46B" as the second outer detection spring positioned at a side opposite to the movable detection electrode 441A side of the movable detection electrode 441B. With this configuration, the movable detection electrode 441A can be supported from both sides by the detection spring 46A, and the attitude of the movable detection electrode 441A is stabilized. Further, the movable detection electrode 441B can be supported from both sides by the detection spring 46B, and the attitude of the movable detection electrode 441B is stabilized.

As described above, the inner detection spring 46A' and the inner detection spring 46B' are provided with the thin portion 460' which is the first thin portion. With this configuration, the quadrature can be suppressed more effectively.

The drive portion 41A includes the movable drive electrode 411A as the first movable drive electrode coupled to the movable detection electrode 441A via the coupling beam 47A as the first beam and the fixed drive electrode 412A as the first fixed drive electrode fixed to the substrate 2 and disposed to face the movable drive electrode 411A. Similarly, the drive portion 41B includes the movable drive electrode 411B as the second movable drive electrode coupled to the movable detection electrode 441B via the coupling beam 47B as the second beam and the fixed drive electrode 412B as the second fixed drive electrode fixed to the substrate 2 and disposed to face the movable drive electrode 411B. The inertial sensor 1 further includes the drive spring 43A as the first drive spring that supports the movable drive electrode 411A in a direction along the X-axis so as to be displaceable and the drive spring 43B as the second drive spring that supports the movable drive electrode 411B in a direction along the X-axis so as to be displaceable. The thickness along the Z-axis direction of each of the first drive spring 43A and the second drive spring 43B is equal to the thickness t along the Z-axis direction of each of the movable detection electrodes 441A and 441B. That is, the drive spring 43A and the drive spring 43B do not have the thin portion. As a result, the drive springs 43A and 43B become difficult to twist, and drive of the movable drive electrodes 411A and 411B becomes stable.

Second Embodiment

Figure 12:
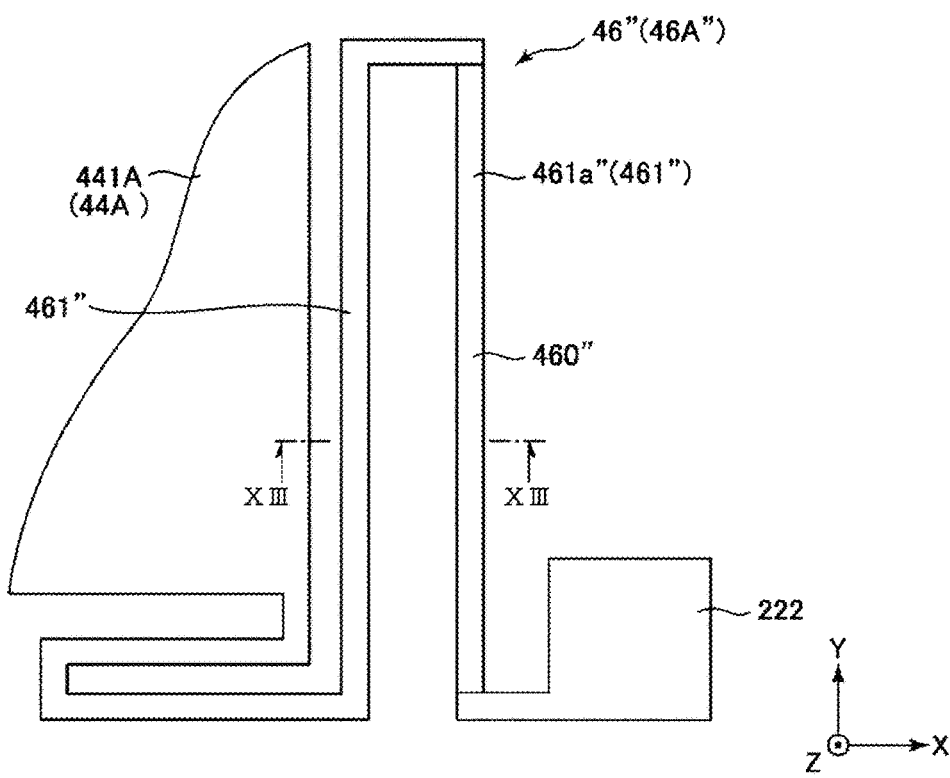
FIG. 12 is a plan view illustrating an outer detection spring of an inertial sensor according to a second embodiment.
Figure 13:
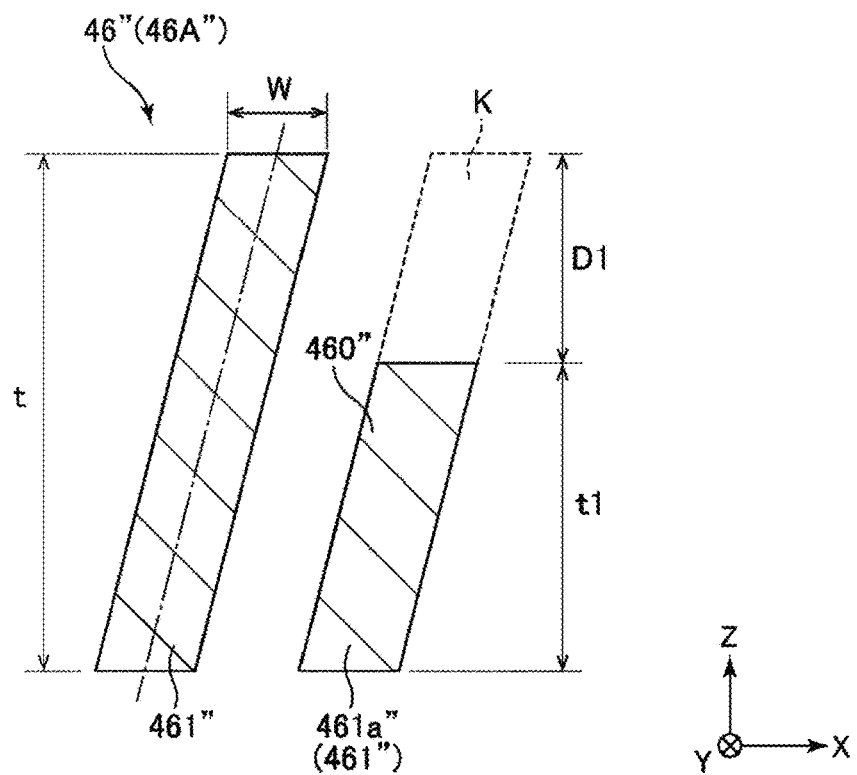
FIG. 13 is a cross-sectional view taken along line XIII-XIII in FIG. 12.

FIG. 12 is a plan view illustrating the outer detection spring of an inertial sensor according to a second embodiment. FIG. 13 is a cross-sectional view taken along line XIII-XIII in FIG. 12.

The second embodiment is the same as the first embodiment described above except that the thin portions 460" are also formed on the outer detection springs 46A" and 46B" similarly as in the inner detection springs 46A' and 46B'. In the following description, the second embodiment will be described focusing on differences from the embodiment described above, and description of the same matters will be omitted. In FIG. 12 and FIG. 13, the same constituent elements as those in the embodiment described above are denoted by the same reference numerals.

In the following, the configuration of the outer detection springs 46A" and 46B" will be described in detail. In the following, the outer detection springs 46A" and 46B" are collectively referred to as an "outer detection spring 46'". Since each of four outer detection springs 46" has the same configuration, in the following, one outer detection spring 46" will be representatively described, and the description of the other outer detection springs 46" will be omitted.

As illustrated in FIG. 12, the outer detection spring 46" has a serpentine shape, and includes a plurality of beams 461" aligned in the X-axis direction and extending in the Y-axis direction. As illustrated in FIG. 13, the cross-sectional shape of each beam 461" viewed from the Y-axis direction is a substantial parallelogram having the thickness t in the Z-axis direction larger than a width W in the X-axis direction, and the major axis L thereof is inclined with respect to the Z-axis. The number of beams 461" is not particularly limited, but is two in the second embodiment.

At least one of the two beams 461" is formed with the thin portion 460" thinner than the thickness t of the silicon substrate 40. In the second embodiment, the cutout K is formed on the upper surface side of the beam 461a" positioned at the tip end side in the inclination direction of the major axis L, and the portion overlapping the cutout K constitutes the thin portion 460". With this configuration, it is possible to reduce the vibration component in the Z-axis direction of the outer detection spring 46" for the same reason as the inner detection spring 46' described in the first embodiment described above. For that reason, the quadrature of the movable detection electrodes 441A and 441B can be reduced as compared with the configuration without the thin portion 460".

Thus, one outer detection spring 46" has been representatively described. In the second embodiment, since the inertial sensor 1 includes four outer detection springs 46", the thin portion 460" may be formed for the each outer detection spring 46" so that the vibration component in the Z-axis direction is sufficiently small, may be zero. The shapes of the thin portion 460" may be different for each outer detection spring 46" or may be the same as each other. The thin portion 460" may not be formed for the outer detection spring 46" substantially having no vibration component in the Z-axis direction. Also, for example, the thin portion 460" may be disposed not only at the beam 461", but also at a connection portion coupling adjacent beams 461".

As illustrated in FIG. 11, forming the thin portion 460" on the outer detection spring 46" is not as effective as forming the thin portion 460' on the inner detection spring 46', but has the effect of suppressing the quadrature. Accordingly, by forming the thin portion 460' in the inner detection spring 46' and forming the thin portion 460" in the outer detection spring 46", it is possible to more effectively suppress the quadrature.

As such, in the inertial sensor 1 of the second embodiment, the outer detection spring 46A" and the outer detection spring 46B" are provided with the thin portions 460". With this configuration, the quadrature can be suppressed more effectively.

Third Embodiment

Figure 14:
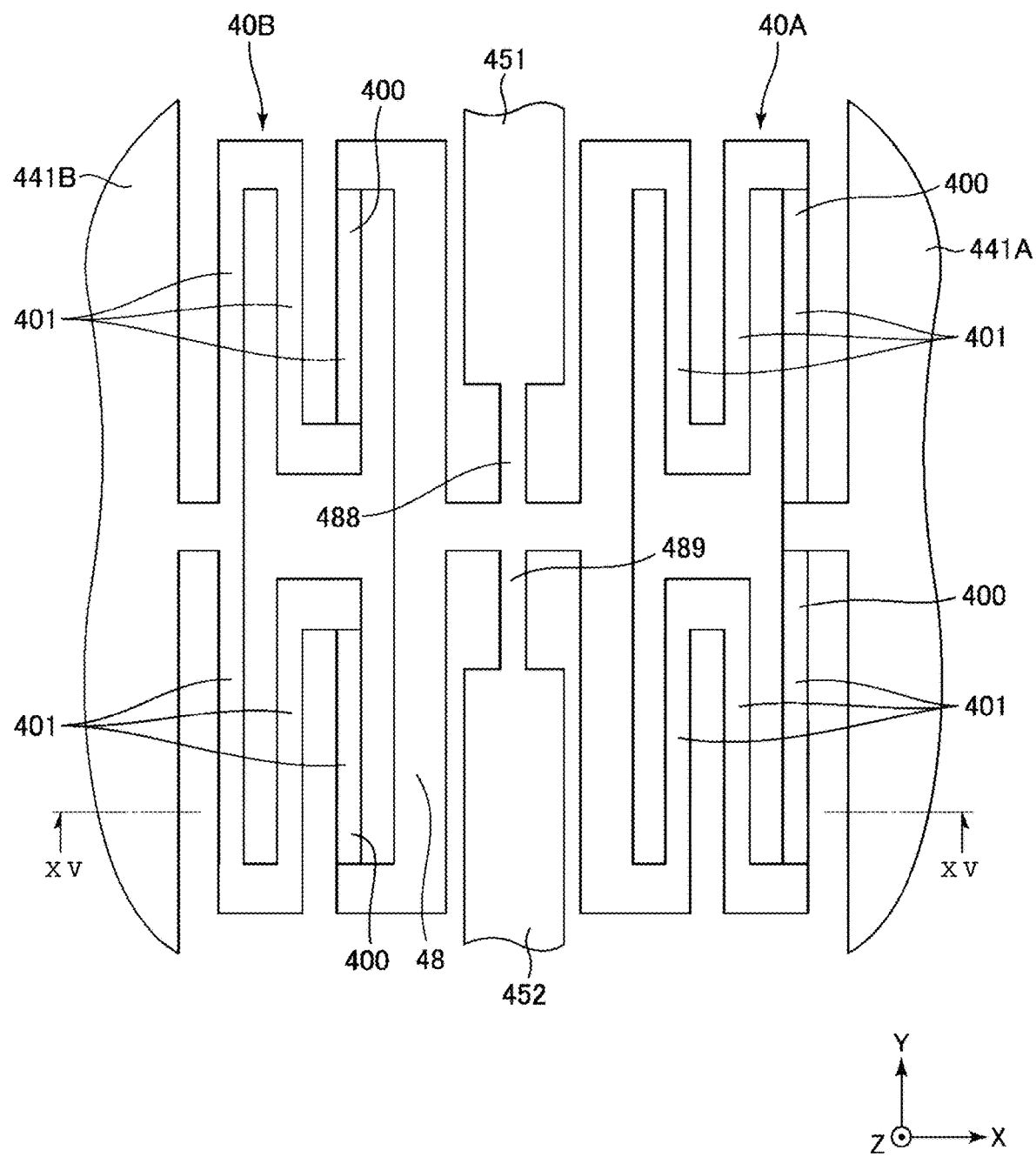
FIG. 14 is a plan view illustrating a connection spring of an inertial sensor according to a third embodiment.
Figure 15:
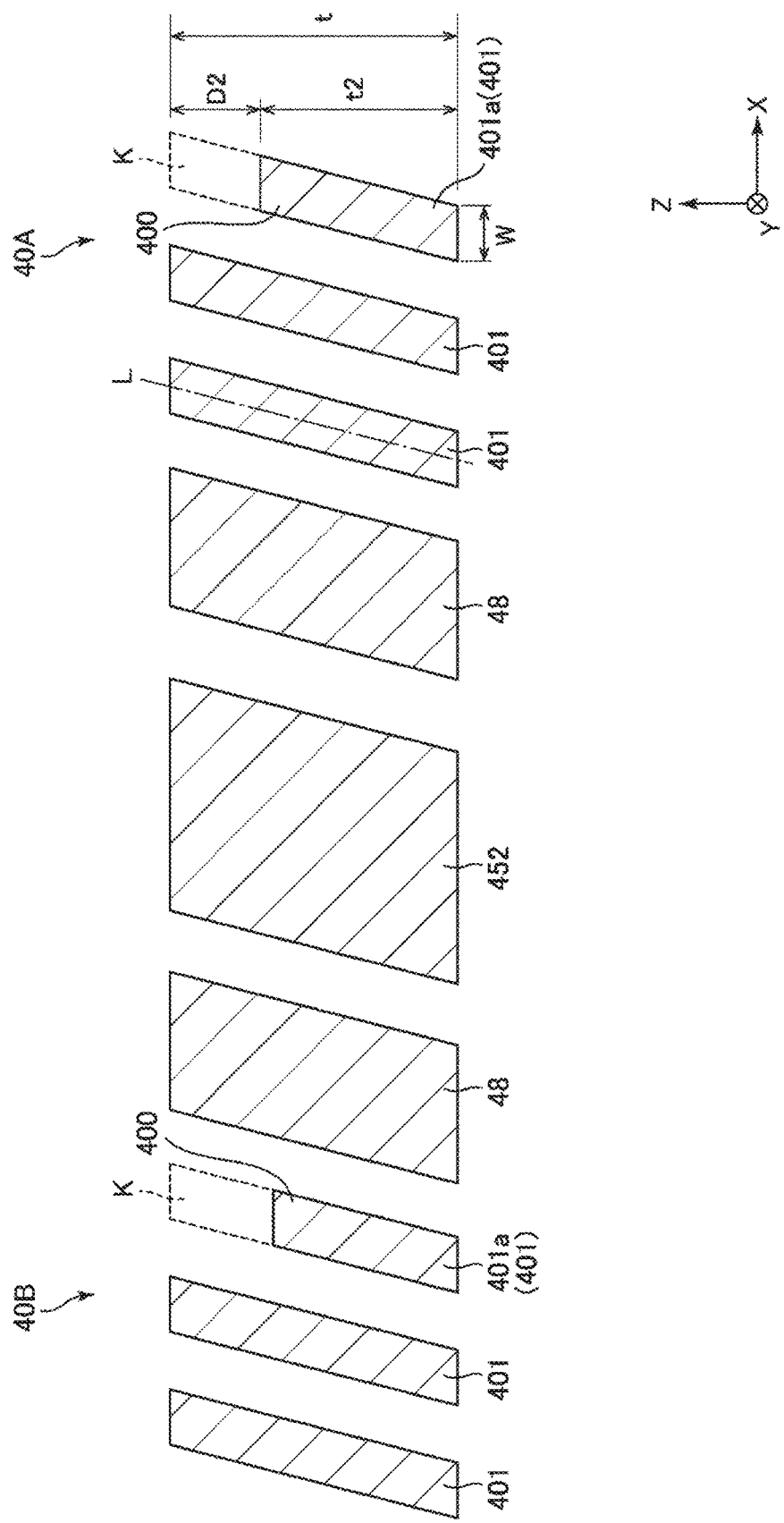
FIG. 15 is a cross-sectional view taken along line XV-XV in FIG. 14.

FIG. 14 is a plan view illustrating a connection spring of an inertial sensor according to a third embodiment. FIG. 15 is a cross-sectional view taken along line XIV-XIV in FIG. 14.

The third embodiment is the same as the first embodiment described above except that a thin portion 400 which is the second thin portion is also formed on the connection springs 40A and 40B similarly as in the inner detection springs 46A' and 46B'. In the following description, the third embodiment will be described focusing on differences from the embodiments described above, and description of the same matters will be omitted. In FIG. 14 and FIG. 15, the same constituent elements as those in the embodiments described above are denoted by the same reference numerals.

In the following, the configuration of the connection springs 40A and 40B will be described in detail. Since the connection springs 40A and 40B have the same configuration as each other, in the following, the connection spring 40A will be representatively described, and the description of the connection spring 40B will be omitted.

As illustrated in FIG. 14, the connection spring 40A has a serpentine shape, and includes a plurality of beams 401 aligned in the X-axis direction and extending in the Y-axis direction. As illustrated in FIG. 15, the cross-sectional shape of each beam 401 viewed from the Y-axis direction is a substantial parallelogram having the thickness t in the Z-axis direction larger than the width W in the X-axis direction, and the major axis L thereof is inclined with respect to the Z-axis. The number of beams 401 is not particularly limited, but is three in the third embodiment.

At least one of the three beams 401 is formed with the thin portion 400 having a thickness t2 thinner than the thickness t of the silicon substrate 40. In the third embodiment, the cutout K having a depth D2 is formed on the upper surface side of the beam 401a positioned at the tip end side in the inclination direction of the major axis L, and a portion overlapping the cutout K constitutes the thin portion 400. With this configuration, it is possible to reduce the vibration component in the Z-axis direction of the connection spring 40A for the same reason as the inner detection spring 46' described in the first embodiment described above. For that reason, the quadrature of the movable detection electrodes 441A and 441B can be reduced as compared with the configuration without the thin portion 400.

Thus, the connection spring 40A has been representatively described. In the third embodiment, since the inertial sensor 1 includes two connection springs 40A and 40B, the thin portion 400 may be formed for each of the connection springs 40A and 40B so that the vibration component in the Z-axis direction is sufficiently small, may be zero. The shapes of the thin portion 400 may be different for each of the connection springs 40A and 40B or may be the same as each other. The thin portion 400 may not be formed for the connection springs 40A and 40B substantially having no vibration component in the Z-axis direction. Also, for example, the thin portion 400 may be disposed not only at the beam 401, but also at a connection portion coupling adjacent beams 401.

As illustrated in FIG. 11, forming the thin portion 400 on the connection springs 40A and 40B is not as effective as forming the thin portion 460' on the inner detection spring 46', but has the effect of suppressing the quadrature. Accordingly, by forming the thin portion 460' in the inner detection spring 46' and forming the thin portion 400 in the connection springs 40A and 40B, it is possible to more effectively suppress the quadrature.

As such, the inertial sensor 1 of the third embodiment includes the frame 48 as the coupling portion positioned between the movable detection electrode 441A and the movable detection electrode 441B, the connection spring 40A as the first connection spring coupling the movable detection electrode 441A and the frame 48, and the connection spring 40B as the second connection spring coupling the movable detection electrode 441B and the frame 48. The thin portion 400 which is the second thin portion is provided in the connection spring 40A and connection spring 40B.

The thickness t2 of the thin portion 400 along the Z-axis direction is t2=t−D2, which is thinner than the thickness t. With this configuration, the quadrature can be suppressed more effectively.

The thickness t2 of the thin portion 400 may be the same as or different from the thickness t1 described above. For example, t2/t1 is may be 0.8 or more and 1.2 or less.

Fourth Embodiment

Figure 16:
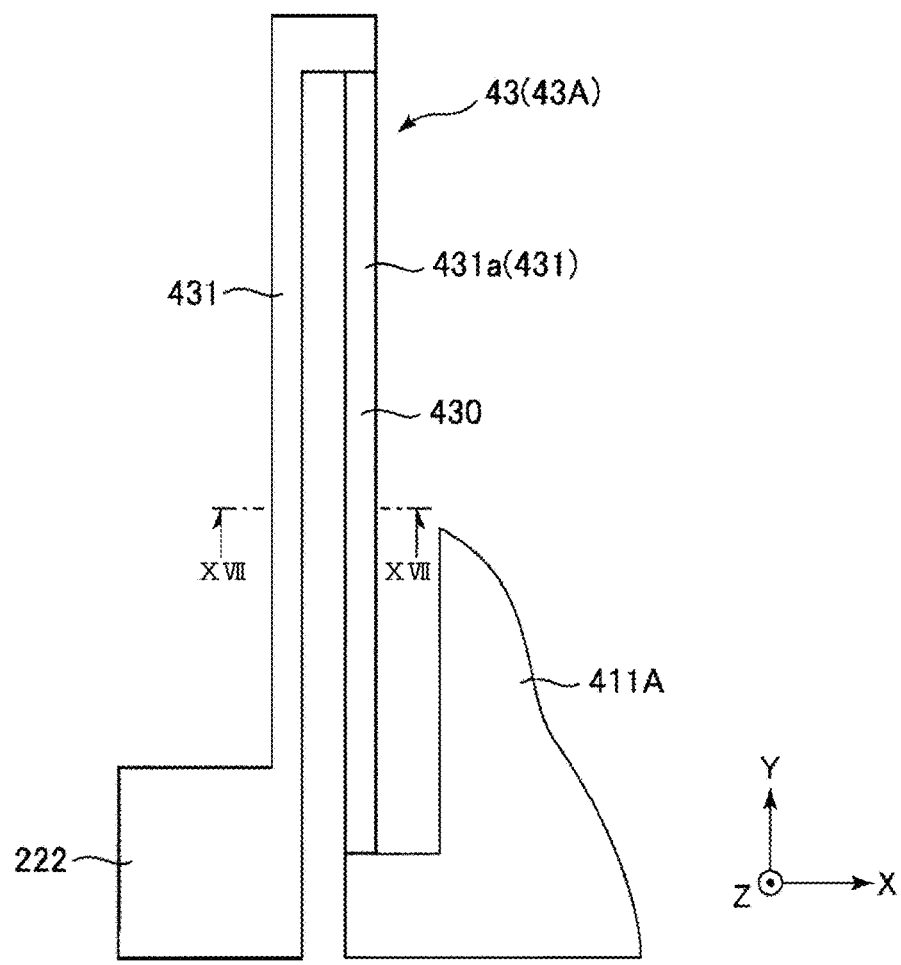
FIG. 16 is a plan view illustrating a drive spring of an inertial sensor according to a fourth embodiment.
Figure 17:
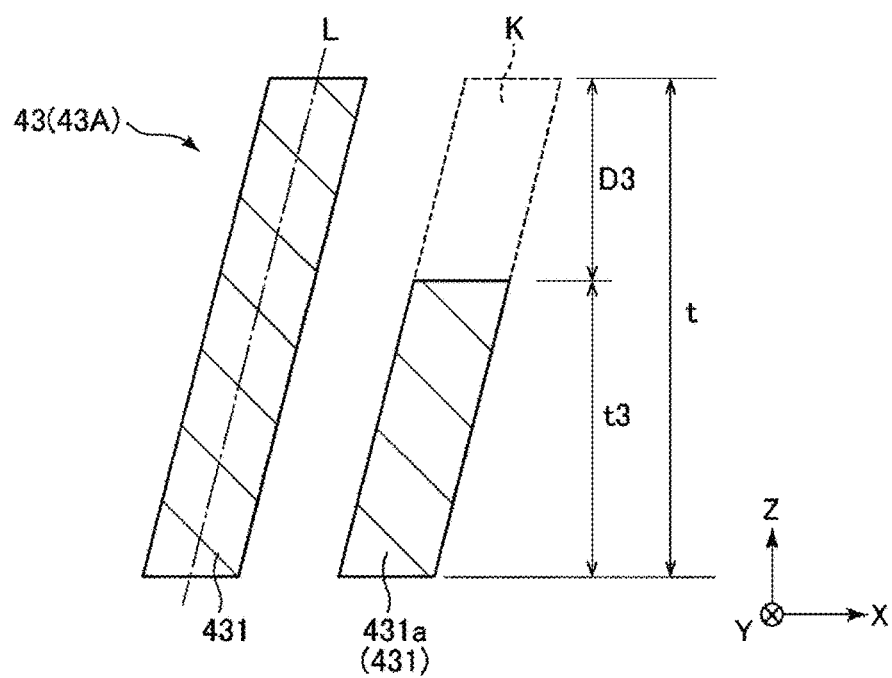
FIG. 17 is a cross-sectional view taken along line XVII-XVII in FIG. 16.

FIG. 16 is a plan view illustrating a drive spring of an inertial sensor according to a fourth embodiment. FIG. 17 is a cross-sectional view taken along line XVII-XVII in FIG. 16.

The fourth embodiment is the same as the first embodiment described above except that a thin portion 430 which is the third thin portion is also formed on the drive springs 43A and 43B similarly as in the inner detection springs 46A' and 46B'. In the following description, the fourth embodiment will be described focusing on differences from the embodiments described above, and the description of the same matters will be omitted. In FIG. 16 and FIG. 17, the same constituent elements as those in the embodiments described above are denoted by the same reference numerals.

In the following, the configuration of the drive springs 43A and 43B will be described in detail. In the following, the drive springs 43A and 43B are collectively referred to as a "drive spring 43". Since eight drive springs 43 have the same configuration as each other, in the following, one drive spring 43 will be representatively described, and the description of the other drive springs 43 will be omitted.

As illustrated in FIG. 16, the drive spring 43 has a serpentine shape, and includes a plurality of beams 431 aligned in the X-axis direction and extending in the Y-axis direction. As illustrated in FIG. 17, the cross-sectional shape of each beam 431 viewed from the Y-axis direction is a substantial parallelogram having the thickness t in the Z-axis direction larger than the width W in the X-axis direction, and the major axis L thereof is inclined with respect to the Z-axis. The number of beams 431 is not particularly limited, but is two in the fourth embodiment.

At least one of the two beams 431 is formed with the thin portion 430 having a thickness t3 thinner than the thickness t of the silicon substrate 40. In the fourth embodiment, the cutout K having a depth D3 is formed on the upper surface side of the beam 431a positioned at the tip end side in the inclination direction of the major axis L, and the portion overlapping the cutout K constitutes the thin portion 430. With this configuration, it is possible to reduce the vibration component in the Z-axis direction of the drive spring 43 for the same reason as the inner detection spring 46' described in the first embodiment described above. For that reason, the quadrature of the movable detection electrodes 441A and 441B can be reduced as compared with the configuration without the thin portion 430.

Thus, one drive spring 43 has been representatively described. In the fourth embodiment, since the inertial sensor 1 includes eight drive springs 43, the thin portion 430 may be formed for each of the eight drive springs 43 so that the vibration component in the Z-axis direction is sufficiently small, may be zero. The shapes of the thin portion 430 may be different for each of the eight drive springs 43 or may be the same as each other. The thin portion 430 may not be formed for the drive spring 43 substantially having no vibration component in the Z-axis direction. Also, for example, the thin portion 430 may be disposed not only at the beam 431, but also at a connection portion coupling adjacent beams 431.

As illustrated in FIG. 11, forming the thin portion 430 on the drive spring 43 is not as effective as forming the thin portion 460' on the inner detection spring 46', but has the effect of suppressing the quadrature. Accordingly, by forming the thin portion 460' in the inner detection spring 46' and forming the thin portion 430 in the drive spring 43, it is possible to more effectively suppress the quadrature.

Fifth Embodiment

Figure 18:
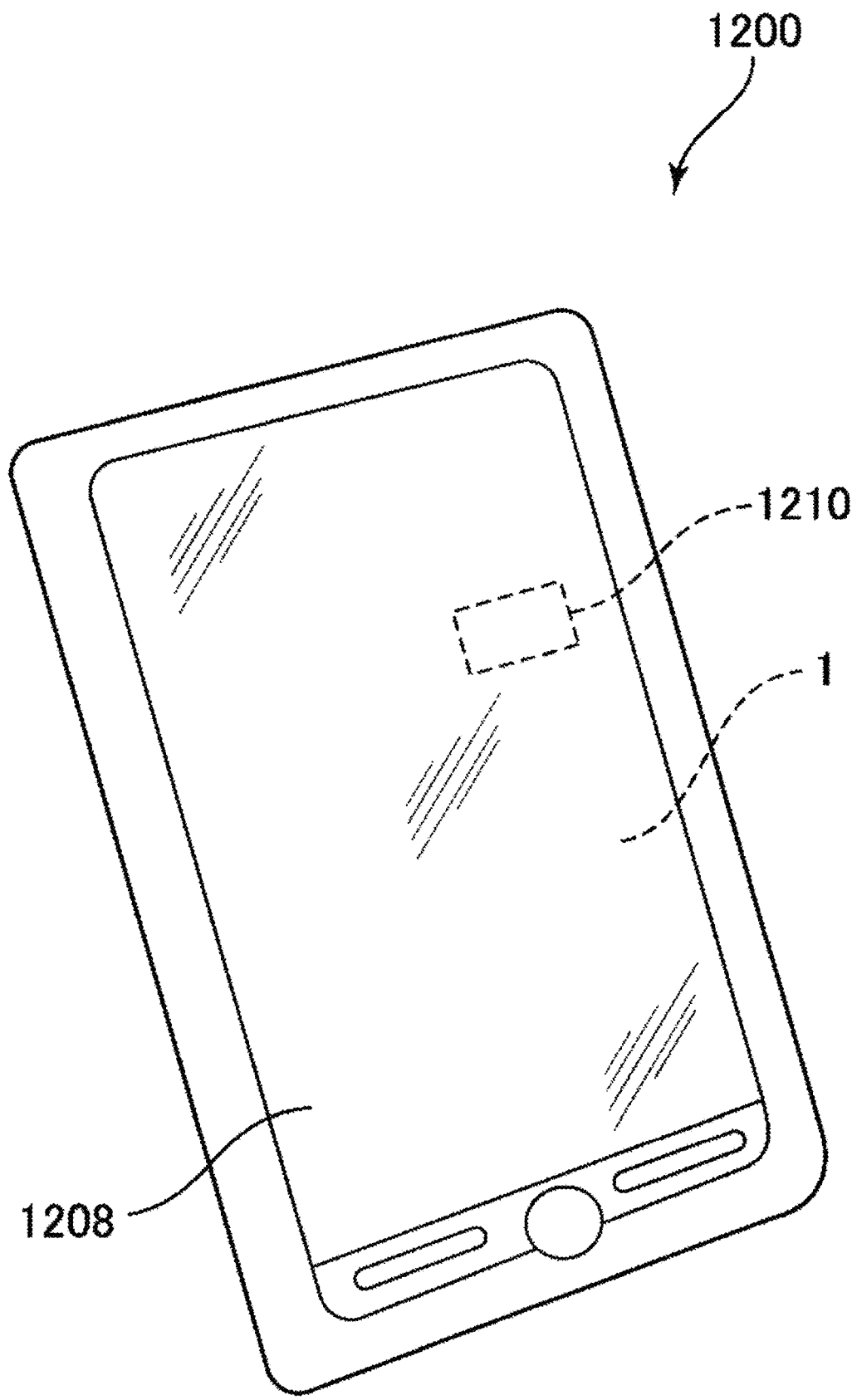
FIG. 18 is a plan view illustrating a smartphone as an electronic device according to a fifth embodiment.

FIG. 18 is a perspective view illustrating a smartphone as an electronic device according to a fifth embodiment.

A smartphone 1200 illustrated in FIG. 18 is one to which the electronic device described in the embodiments is applied. In the smartphone 1200, the inertial sensor 1 and a control circuit 1210 that performs control based on detection signals output from the inertial sensor 1 are incorporated. Detection data measured by the inertial sensor 1 is transmitted to the control circuit 1210, and the control circuit 1210 can recognize the attitude and behavior of the smartphone 1200 from the received detection data, change a display image displayed on a display unit 1208, generate an alarm sound or sound effect, or drive the vibration motor to vibrate the main body.

The smartphone 1200 as such an electronic device includes the inertial sensor 1. For that reason, the effect of the inertial sensor 1 described above can be obtained, and high reliability can be exhibited.

In addition to the smartphone 1200 described above, the electronic device can be applied to, for example, a personal computer, a digital still camera, a tablet terminal, a clock, a smartphone, an ink jet printer, a laptop personal computer, a TV, a wearable terminals such as HMD (head mounted display), a video camera, a video tape recorder, a car navigation device, a pager, an electronic datebook, an electronic dictionary, a calculator, an electronic game machines, a word processor, a work station, a videophone, a security TV monitor, an electronic binoculars, a POS terminal, medical equipment, a fish finder, various measuring instruments, mobile terminal base station equipment, various instruments of vehicles, aircraft, and ships, a flight simulator, a network server, and the like.

Sixth Embodiment

Figure 19:
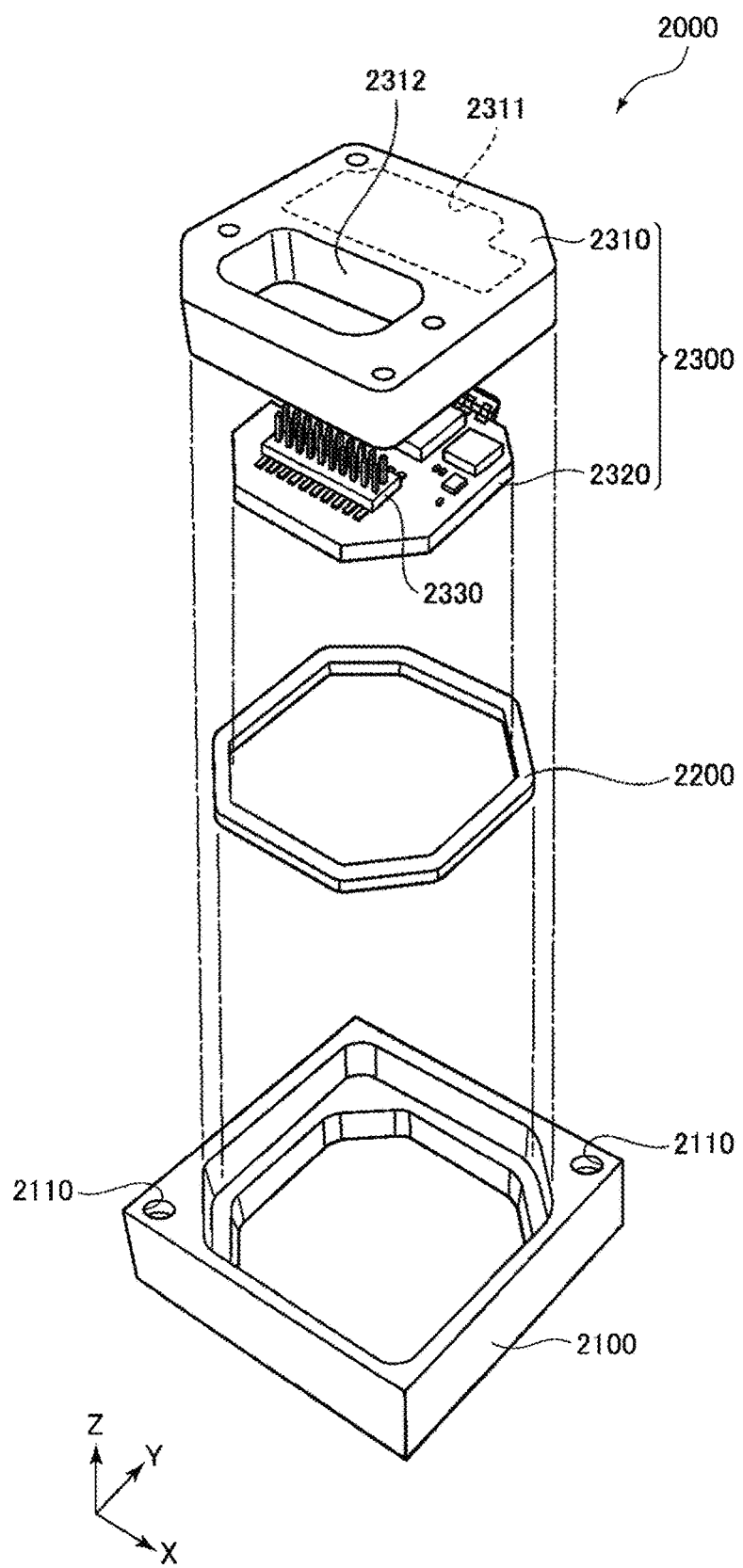
FIG. 19 is an exploded perspective view illustrating an inertia measurement device as an electronic device according to a sixth embodiment.

FIG. 19 is an exploded perspective view illustrating an inertia measurement device as an electronic device according to a sixth embodiment. FIG. 20 is a perspective view of a substrate included in the inertia measurement device illustrated in FIG. 19.

An inertia measurement device 2000 (IMU: Inertia measurement Unit) as the electronic device illustrated in FIG. 19 is an inertia measurement device that detects the attitude and behavior of a mounted device such as an automobile or a robot. The inertia measurement device 2000 functions as a six-axis motion sensor including three-axis acceleration sensors and three-axis angular velocity sensors.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced such that the device can be mounted on a smartphone or a digital camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Similarly to the overall shape of the inertia measurement device 2000 described above, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

Further, the sensor module 2300 includes an inner case 2310 and a substrate 2320. The inner case 2310 is a member for supporting the substrate 2320, and has a shape that fits inside the outer case 2100. A concave portion 2311 for preventing contact with the substrate 2320 and an opening 2312 for exposing a connector 2330 described later are formed in the inner case 2310. Such an inner case 2310 is bonded to the outer case 2100 via the bonding member 2200. The substrate 2320 is bonded to the lower surface of the inner case 2310 via an adhesive.

As illustrated in FIG. 20, a connector 2330, an angular velocity sensor 2340z for measuring the angular velocity around the Z-axis, an acceleration sensor 2350 for measuring acceleration in each axis direction of the X-axis, the Y-axis, and the Z-axis and the like are mounted on the upper surface of the substrate 2320. An angular velocity sensor 2340x for measuring the angular velocity around the X-axis and an angular velocity sensor 2340y for measuring the angular velocity around the Y-axis are mounted on the side surface of the substrate 2320. As these sensors, the inertial sensor described in the embodiment can be applied.

A control IC 2360 is mounted on the lower surface of the substrate 2320. The control IC 2360 is a micro controller unit (MCU) and controls each unit of the inertia measurement device 2000. In the storing unit, programs defining the order and contents for measuring the acceleration and angular velocity, programs for digitizing detected data and incorporating the detected data into packet data, accompanying data, and the like are stored. In addition, a plurality of electronic components are mounted on the substrate 2320.

Seventh Embodiment

Figure 21:
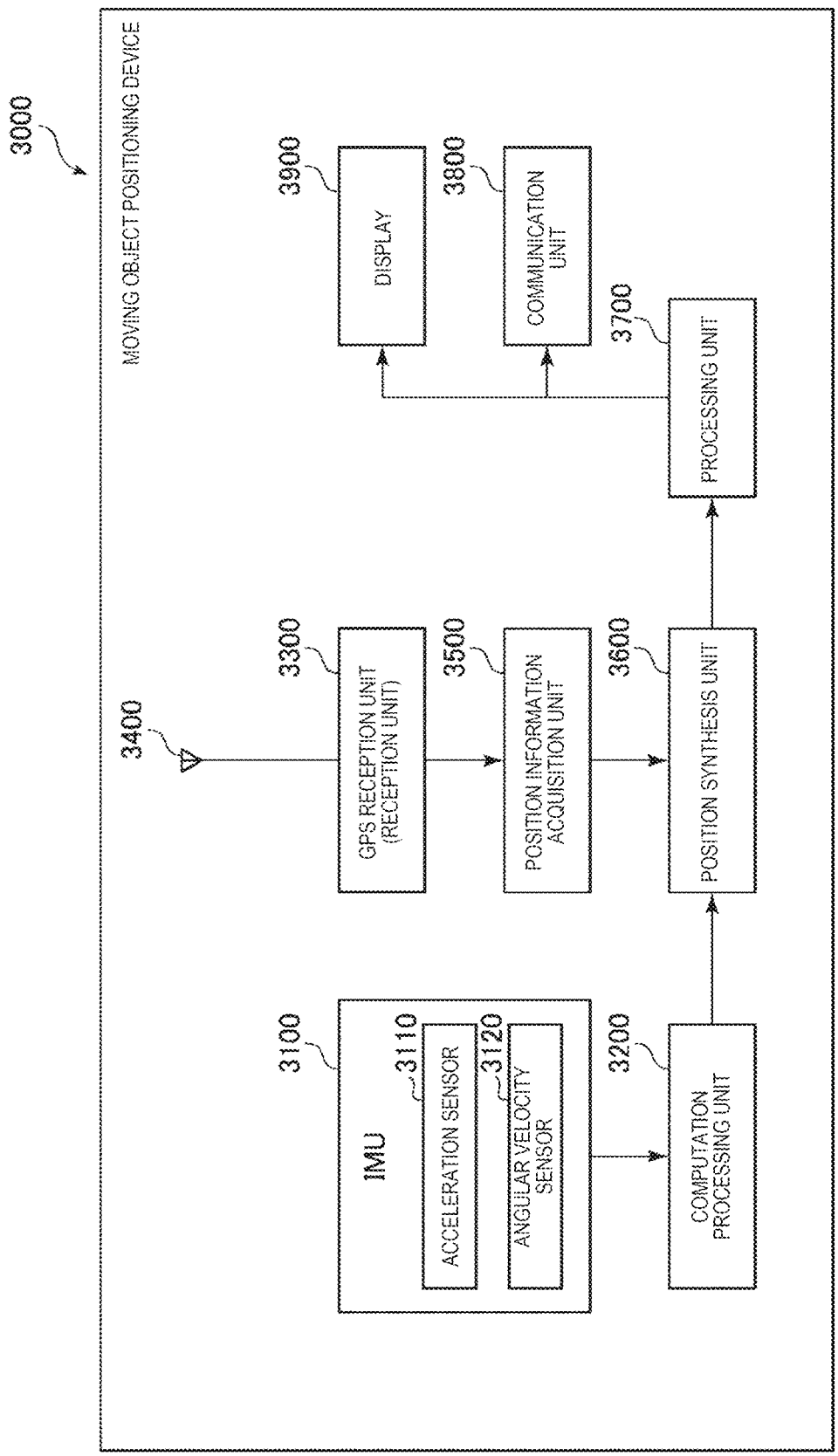
FIG. 21 is a block diagram illustrating the entire system of a vehicle positioning device as an electronic device according to a seventh embodiment.
Figure 22:
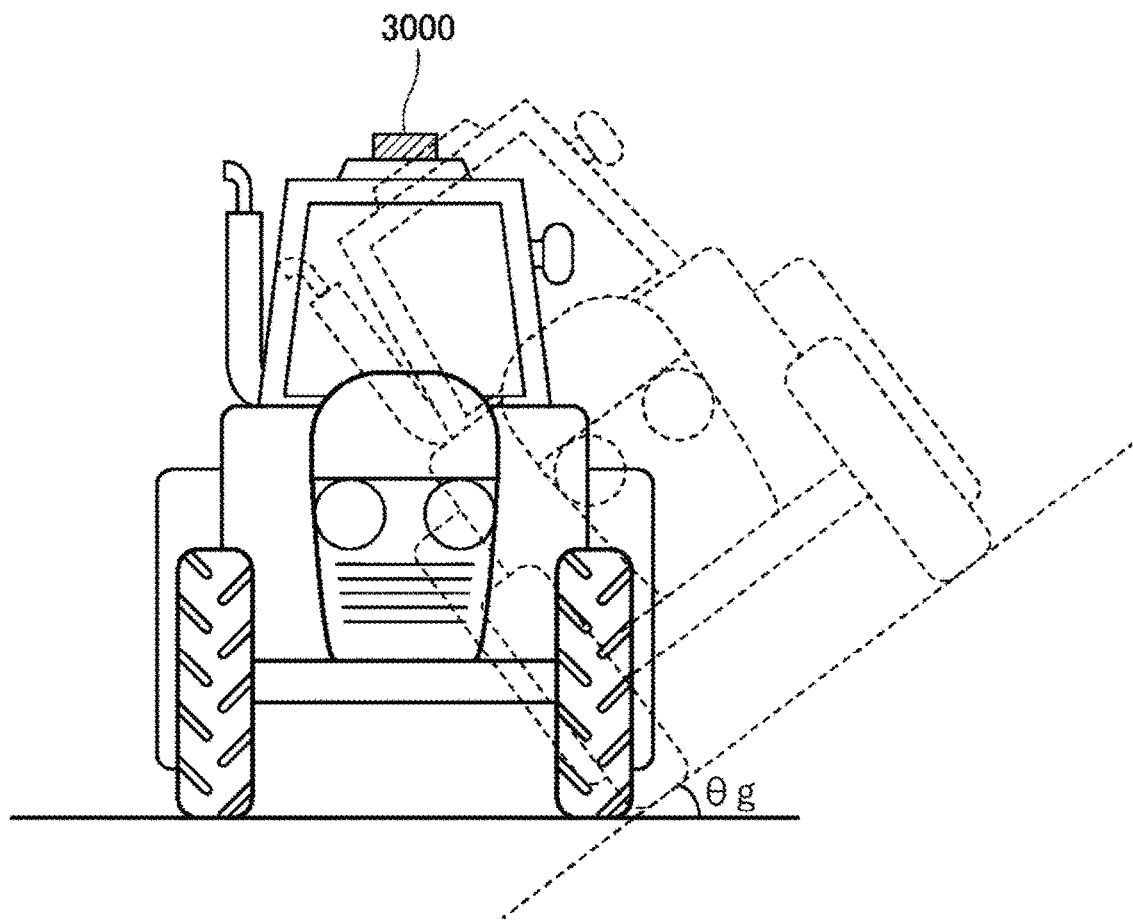
FIG. 22 is a diagram illustrating an action of the vehicle positioning device illustrated in FIG. 21.

FIG. 21 is a block diagram illustrating the entire system of a vehicle positioning device as an electronic device according to a seventh embodiment. FIG. 22 is a diagram illustrating the operation of the vehicle positioning device illustrated in FIG. 21.

A vehicle positioning device 3000 illustrated in FIG. 21 is a device which is used by being mounted on a vehicle and performs positioning of the vehicle. The vehicle is not particularly limited, and may be any of a bicycle, an automobile, a motorcycle, a train, an airplane, a ship, and the like, but in the seventh embodiment, description will be made on a four-wheeled automobile as the vehicle.

The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data including acceleration and attitude of the vehicle.

The GPS reception unit 3300 receives a signal from the GPS satellite via the receiving antenna 3400. Further, the position information acquisition unit 3500 outputs GPS positioning data representing the position (latitude, longitude, altitude), speed, direction of the vehicle positioning device 3000 based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 22, if the attitude of the vehicle is different due to the influence of inclination θ of the ground or the like, the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data.

The position data output from the position synthesis unit 3600 is subjected to predetermined processing by the processing unit 3700 and displayed on the display 3900 as a positioning result. Further, the position data may be transmitted to the external apparatus by the communication unit 3800.

Eighth Embodiment

Figure 23:
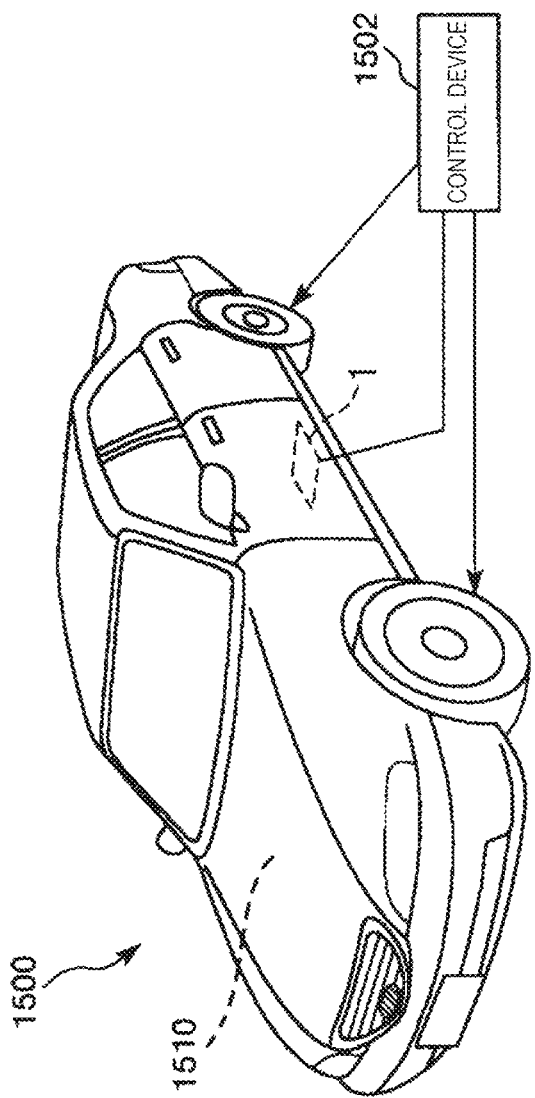
FIG. 23 is a perspective view illustrating a vehicle according to an eighth embodiment.

FIG. 23 is a perspective view illustrating a vehicle according to an eighth embodiment of the present disclosure.

An automobile 1500 illustrated in FIG. 23 is an automobile to which the vehicle described in the embodiment is applied. In this figure, the automobile 1500 includes at least one system 1510 of an engine system, a brake system, and a keyless entry system. The inertial sensor 1 is incorporated in the automobile 1500, and the attitude of the vehicle body can be measured by the inertial sensor 1. The detection signal of the inertial sensor 1 is supplied to the control device 1502, and the control device 1502 can control the system 1510 based on the signal.

As such, the automobile 1500 as the vehicle includes the inertial sensor 1. For that reason, the effect of the inertial sensor 1 described above can be obtained, and high reliability can be exhibited.

In addition, the inertial sensor 1 can also be widely applied to a car navigation system, a car air conditioner, an anti-lock braking system (ABS), an air bag, a tire pressure monitoring system (TPMS), an engine controller, and an electronic control unit (ECU) such as a battery monitor of a hybrid car or an electric automobile. Also, the vehicle is not limited to the automobile 1500, but can also be applied to an airplane, a rocket, a satellite, a ship, an automated guided vehicle (AGV), a biped walking robot, an unmanned airplane such as a drone, and the like.

Although the inertial sensor of the present disclosure, the electronic device, and the vehicle of the present disclosure have been described based on the embodiments, the present disclosure is not limited thereto. The configuration of each unit can be replaced with any configuration having the same function. In addition, any other constituent elements may be added to the present disclosure. Further, the embodiments described above may be appropriately combined. For example, in addition to the inner detection spring, a thin portion may be formed on two or more springs selected from the outer detection spring, the connection spring, and the drive spring.

In the embodiments described above, description has been made on the configuration for detecting the angular velocity as the configuration of the inertial sensor, but is not limited thereto. For example, a configuration for detecting acceleration may be used.

What is claimed is:

1. An inertial sensor comprising:
   assuming that three axes orthogonal to each other are an X-axis, a Y-axis, and a Z-axis,
   a substrate;
   a first detection movable body and a second detection movable body which overlap the substrate in a direction along the Z-axis and are disposed side by side in a direction along the X-axis;
   a first detection spring that supports the first detection movable body to be displaceable in the direction along the X-axis;
   a second detection spring that supports the second detection movable body to be displaceable in the direction along the X-axis,
   a first drive portion that drives the first detection movable body with a drive component in the direction along the X-axis;
   a second drive portion that drives the second detection movable body with a drive component in the direction along the X-axis;
   a first fixed detection electrode disposed on the substrate and facing the first detection movable body; and
   a second fixed detection electrode disposed on the substrate and facing the second detection movable body, wherein
   the first detection spring and the second detection spring are provided with a first thin portion thinner in the direction along the Z-axis than a thickness of the first detection movable body and the second detection movable body in the direction along the Z-axis.

2. The inertial sensor according to claim 1, wherein
   the first detection spring includes a first inner detection spring positioned at a second detection movable body side of the first detection movable body and a first outer detection spring positioned at a side of the first detection movable body opposite to the second detection movable body, and
   the second detection spring includes a second inner detection spring positioned at a first detection movable body side of the second detection movable body and a second outer detection spring positioned at a side of the second detection movable body opposite to the first detection movable body.

3. The inertial sensor according to claim 2, wherein
   the first thin portion is provided on the first inner detection spring and the second inner detection spring.

4. The inertial sensor according to claim 2, wherein
   the first thin portion is provided in the first outer detection spring and the second outer detection spring.

5. The inertial sensor according to claim 1, further comprising:
   a coupling portion that is positioned between the first detection movable body and the second detection movable body;
   a first connection spring that couples the first detection movable body and a connection portion; and
   a second connection spring that couples the second detection movable body and the connection portion, wherein
   the first connection spring and the second connection spring are provided with a second thin portion thinner than a thickness of the first detection movable body and the second detection movable body in the direction along the Z-axis.

6. The inertial sensor according to claim 1, wherein
   the first drive portion includes a first movable drive electrode coupled to a first movable detector via a first beam and a first fixed drive electrode fixed to the substrate and disposed to face the first movable drive electrode,
   the second drive portion includes a second movable drive electrode coupled to a second movable detector via a second beam and a second fixed drive electrode fixed to the substrate and disposed to face the second movable drive electrode,
   the inertial sensor further comprises a first drive spring that supports the first movable drive electrode to be displaceable in the direction along the X-axis and a second drive spring that supports the second movable drive electrode to be displaceable in the direction along the X-axis, and
   a thickness along the Z-axis direction of the first drive spring and the second drive spring is equal to a thickness along the Z-axis direction of the first detection movable body and the second detection movable body.

7. An electronic device comprising the inertial sensor according to claim 1.

8. A vehicle comprising the inertial sensor according to claim 1.

* * * * *